US012543033B2

(12) United States Patent
Shen et al.

(10) Patent No.: US 12,543,033 B2
(45) Date of Patent: Feb. 3, 2026

(54) RADIO FREQUENCY CHANNEL SHARING METHOD AND RELATED APPARATUS

(71) Applicant: HUAWEI TECHNOLOGIES CO., LTD., Guangdong (CN)

(72) Inventors: Li Shen, Shenzhen (CN); Le Jin, Shanghai (CN); Fengguang Qiu, Shanghai (CN)

(73) Assignee: Huawei Technologies Co., LTD., Shenzhen (CN)

( * ) Notice: Subject to any disclaimer, the term of this patent is extended or adjusted under 35 U.S.C. 154(b) by 337 days.

(21) Appl. No.: 18/255,065

(22) PCT Filed: Nov. 30, 2021

(86) PCT No.: PCT/CN2021/134224
§ 371 (c)(1),
(2) Date: May 30, 2023

(87) PCT Pub. No.: WO2022/111718
PCT Pub. Date: Jun. 2, 2022

(65) Prior Publication Data
US 2024/0007843 A1  Jan. 4, 2024

(30) Foreign Application Priority Data
Nov. 30, 2020 (CN) .......................... 202011377601.6

(51) Int. Cl.
*H04W 8/18* (2009.01)
*H04B 17/318* (2015.01)
(Continued)

(52) U.S. Cl.
CPC .......... *H04W 8/183* (2013.01); *H04B 17/328* (2023.05); *H04W 8/22* (2013.01); *H04W 36/00692* (2023.05); *H04W 76/20* (2018.02)

(58) Field of Classification Search
CPC ................... H04W 8/183; H04W 8/22; H04W 36/00692; H04W 76/20; H04W 76/15;
(Continued)

(56) References Cited

U.S. PATENT DOCUMENTS 11,039,297 B1 * 6/2021 Desai ...................... H04L 65/65
12,284,720 B2 * 4/2025 Gopal ................... H04W 52/52
(Continued)

FOREIGN PATENT DOCUMENTS

| CN | 105611588 A | 5/2016 |
|---|---|---|
| CN | 106465450 A | 2/2017 |

OTHER PUBLICATIONS

3GPP TS 38.101-3 V16.5.0, "3rd Generation Partnership Project, Technical Specification Group Radio Access Network, NR, User Equipment (UE) radio transmission and reception, Part 3:Range 1 and Range 2 Interworking operation with other radios (Release 16)," Sep. 2020, 496 pages.

*Primary Examiner* — Abdullahi Ahmed
(74) *Attorney, Agent, or Firm* — Fish & Richardson P.C.

(57) ABSTRACT

This application discloses methods and apparatuses for radio frequency channel sharing. An example method includes sending, by a terminal, first user equipment (UE) capability information to a network side device after receiving UE capability enquiry signaling that is sent by the network side device for a first subscriber identity module (SIM) card. The example method further includes sending, by the terminal, second UE capability information to the network side device after receiving UE capability enquiry signaling that is sent by the network side device for a second SIM card, wherein radio frequency capability information in the first UE capability information is the same as radio frequency capability information in the second UE capability information.

20 Claims, 18 Drawing Sheets

(51) Int. Cl.
*H04W 8/22* (2009.01)
*H04W 36/00* (2009.01)
*H04W 76/20* (2018.01)

(58) Field of Classification Search
CPC .................. H04W 8/24; H04W 36/00; H04W 36/0016; H04W 36/0027; H04B 17/328
See application file for complete search history.

(56) References Cited

U.S. PATENT DOCUMENTS

| | | | |
|---|---|---|---|
| 2021/0282103 A1* | 9/2021 | Zhu ....................... | H04W 76/15 |
| 2023/0127408 A1* | 4/2023 | Wu ....................... | H04W 76/27 |
| | | | 455/458 |
| 2023/0354279 A1* | 11/2023 | Kumar .................. | H04L 5/0051 |
| 2024/0389187 A1* | 11/2024 | Hong .................... | H04W 76/27 |

* cited by examiner

RADIO FREQUENCY CHANNEL SHARING METHOD AND RELATED APPARATUS

CROSS-REFERENCE TO RELATED APPLICATIONS

This application is a national stage of International Application No. PCT/CN2021/134224, filed on Nov. 30, 2021, which claims priority to Chinese Patent Application No. 202011377601.6, filed on Nov. 30, 2020. Both of the aforementioned applications are hereby incorporated by reference in their entireties.

TECHNICAL FIELD

This application relates to the field of communication technologies, and in particular, to a radio frequency channel sharing method and a related apparatus.

BACKGROUND

With rapid development of wireless communication technologies, people increasingly rely on wireless terminals. In some countries and regions, terminal users usually use dual-SIM or even multi-SIM mobile phones. For example, in an underdeveloped area with poor mobile network signal coverage, a user may use a multi-SIM mobile phone, insert a plurality of subscriber identity module (subscriber identity module, SIM) cards of carriers, and select a carrier network covering a current location for access, to improve a possibility of obtaining a mobile network service. For another example, different carriers have different tariff policies. The user can use a multi-SIM mobile phone to make calls on a carrier network with low call tariffs and perform a data service on a carrier network with low mobile data tariffs.

A dual-SIM terminal is used as an example. Currently, there are two specifications for communication: dual SIM dual standby (dual SIM dual standby, DSDS) and dual SIM dual active (dual SIM dual active, DSDA). For a DSDS terminal, only one SIM card can be used to provide a call service and an internet data service at one time, and the other SIM card can only be in a standby state and cannot provide the call service or the internet data service. For a DSDA terminal, two SIM cards can be used simultaneously. For example, one SIM card is used for the call service, and the other SIM card is used for the internet data service. Compared with the DSDS terminal, the DSDA terminal has more powerful functions. However, because the DSDA terminal needs to support dual SIM cards to work at the same time, two sets of transmit and receive radio frequency channels are needed. Therefore, more software and hardware resources are required.

In the conventional technology, when a terminal uses a DSDA solution, a primary SIM card is usually a default SIM card, and supports the call service and the internet data service, and a secondary SIM card supports the call service. Because a data volume of the call service is small, carrier aggregation (carrier aggregation, CA) does not need to be supported. Therefore, the secondary SIM card needs only a small number of radio frequency channels. In this way, complexity of a radio frequency circuit design of the terminal is reduced, and costs of the terminal are also reduced. However, because the primary SIM card and the secondary SIM card have different radio frequency capabilities, when the user needs to switch the data service to the other SIM card, the radio frequency capabilities of the two SIM cards are accordingly switched. In this case, the terminal needs to report terminal capability information again to respective networks of the two SIM cards. Therefore, both the primary SIM card and the secondary SIM card of the terminal need to deregister from current networks, and then initiate a registration procedure. Consequently, switching is slow, and a service on the terminal is prone to interruption.

SUMMARY

This application provides a radio frequency channel sharing method and a related apparatus, so that when a data service is switched between different SIM cards, a terminal does not need to initiate a deregistration procedure and a registration procedure, thereby reducing a switching time and avoiding service interruption.

According to a first aspect, this application provides a radio frequency channel sharing method. The method includes: A terminal sends first UE capability information to a network side device after receiving UE capability enquiry signaling that is sent by the network side device and that is for a first subscriber identity module SIM card; the terminal sends second UE capability information to the network side device after receiving UE capability enquiry signaling that is sent by the network side device and that is for a second SIM card, where radio frequency capability information in the first UE capability information is the same as radio frequency capability information in the second UE capability information: the terminal receives first RRC connection reconfiguration signaling that is sent by the network side device and that is for the first SIM card, where the first RRC connection reconfiguration signaling is used to add a secondary carrier for the first SIM card; after adding the secondary carrier for the first SIM card in response to the first RRC connection reconfiguration signaling, the terminal receives a switching operation of switching a data service from the first SIM card to the second SIM card; the terminal releases a radio frequency channel occupied by the secondary carrier of the first SIM card in response to the switching operation; the terminal receives second RRC connection reconfiguration signaling that is sent by the network side device and that is for the second SIM card, where the second RRC connection reconfiguration signaling is used to add a secondary carrier for the second SIM card; and in response to the second RRC connection reconfiguration signaling, the terminal configures a radio frequency channel for the secondary carrier of the second SIM card, and adds the secondary carrier of the second SIM card.

According to the radio frequency channel sharing method provided in this application, the terminal may report a same radio frequency capability when each SIM card registers with the network side and reports the UE capability information, and the terminal may dynamically allocate a radio frequency channel resource to each SIM card. When the terminal switches the data service from the first SIM card to the second SIM card, the terminal 100 may actively request, to the network side by using the first SIM card, to release a secondary carrier on the first SIM card, and release the radio frequency channel resource occupied by the secondary carrier on the first SIM card. Then the terminal adds the secondary carrier for the second SIM card, and configures the radio frequency channel resource required by the secondary carrier on the second SIM card. In this way, when the data service is switched between the different SIM cards, the terminal does not need to initiate a deregistration procedure and a registration procedure, thereby reducing a switching time.

In a possible implementation, after the terminal receives the first RRC connection reconfiguration signaling, the method further includes: The terminal determines, based on a band combination of the secondary carrier in the first RRC connection reconfiguration signaling and a quantity of multiple-input multiple-output MIMO layers on each band, a radio frequency channel required by the secondary carrier of the first SIM card; and when the terminal determines that a radio frequency channel that is not configured on the terminal includes the radio frequency channel required by the secondary carrier of the first SIM card, the terminal configures the required radio frequency channel for the first SIM card, and adds the secondary carrier for the first SIM card.

In a possible implementation, that the terminal adds the secondary carrier for the first SIM card includes: The terminal finds, through measurement, that a signal strength of a secondary cell of the first SIM card is a first value; and the terminal sends a first measurement report to the network side device by using the first SIM card, where the signal strength of the secondary cell of the first SIM card in the first measurement report is the first value, and the first measurement report is used to trigger the network side device to add the secondary carrier for the first SIM card.

In a possible implementation, the method further includes: When the terminal determines that the radio frequency channel that is not configured on the terminal does not include the radio frequency channel required by the secondary carrier of the first SIM card, the terminal finds, through measurement, that a signal strength of a secondary cell of the first SIM card is a first value, and the terminal sends a second measurement report to the network side device by using the first SIM card, where the signal strength of the secondary cell of the first SIM card in the second measurement report is a preset value, the preset value is less than the first value, and the second measurement report is used to trigger the network side device to release the secondary carrier of the first SIM card.

In a possible implementation, the method further includes: The terminal reports a third measurement report to the network side device in response to the switching operation, where a signal strength of a secondary cell of the first SIM card in the third measurement report is a preset value, and the third measurement report is used to indicate the network side device to release the secondary carrier of the first SIM card.

In a possible implementation, after the terminal receives the second RRC connection reconfiguration signaling, the method further includes: The terminal determines, based on a band combination of the secondary carrier in the second RRC connection reconfiguration signaling and a quantity of MIMO layers on each band, a radio frequency channel required by the secondary carrier of the second SIM card; and when the terminal determines that a radio frequency channel that is not configured on the terminal includes the radio frequency channel required by the secondary carrier of the first SIM card, the terminal configures the required radio frequency channel for the second SIM card, and adds the secondary carrier for the second SIM card.

In a possible implementation, the method further includes; The terminal finds, through measurement, that a signal strength of a secondary cell of the second SIM card is a second value: and the terminal sends a fourth measurement report to the network side device by using the second SIM card, where the signal strength of the secondary cell of the second SIM card in the fourth measurement report is the second value, and the fourth measurement report is used to trigger the network side device to add the secondary carrier for the second SIM card.

In a possible implementation, the method further includes: The terminal finds, through measurement, that a signal strength of a secondary cell of the second SIM card is a second value; and the terminal sends a fourth measurement report to the network side device by using the second SIM card, where the signal strength of the secondary cell of the second SIM card in the fourth measurement report is the second value, and the fourth measurement report is used to trigger the network side device to add the secondary carrier for the second SIM card.

In a possible implementation, the method further includes: When the terminal determines that the radio frequency channel that is not configured on the terminal does not include the radio frequency channel required by the secondary carrier of the second SIM card, the terminal finds, through measurement, that a signal strength of a secondary cell of the second SIM card is a second value; and the terminal sends a fifth measurement report to the network side device by using the second SIM card, where the signal strength of the secondary cell of the second SIM card in the fifth measurement report is a preset value, the preset value is less than the second value, and the fifth measurement report is used to trigger the network side device to release the secondary carrier of the second SIM card.

In a possible implementation, before the terminal receives the switching operation, the first SIM card supports a first radio frequency capability, the second SIM card supports a second radio frequency capability, the first radio frequency capability is stronger than the second radio frequency capability, the radio frequency capability information in the first UE capability information is the first radio frequency capability, the radio frequency capability information in the second UE capability information is the first radio frequency capability, the first radio frequency capability includes a capability of enabling the network side device to add a secondary carrier for the terminal, and the second radio frequency capability does not include the capability of enabling the network side device to add the secondary carrier for the terminal.

In a possible implementation, the radio frequency capability information includes a band combination supporting carrier aggregation CA and a quantity of MIMO layers of each band, and both the first UE capability information and the second UE capability information includes one or more bandEUTRA information elements and a FeatureSet information element corresponding to each bandEUTRA information element, where the one or more bandEUTRA information elements indicate the band combination supporting CA, and the FeatureSet information element corresponding to each bandEUTRA information element indicates the quantity of the MIMO layers of each band.

According to a second aspect, this application provides another radio frequency channel sharing method. The method includes: A terminal sends first UE capability information to a network side device after receiving UE capability enquiry signaling that is sent by the network side device and that is fora first SIM card, where the first SIM card supports a first radio frequency capability, and the first UE capability information includes information about the first radio frequency capability; the terminal sends second UE capability information to the network side device after receiving UE capability enquiry signaling that is sent by the network side device and that is for a second SIM card, where the second SIM card supports a second radio frequency capability, the second UE capability information includes information about the first radio frequency capability, and the first radio frequency capability is stronger than the second radio frequency capability; the terminal receives first RRC connection reconfiguration signaling that is sent by the network side device and that is for the first SIM card, where the first RRC connection reconfiguration signaling is used to add a secondary carrier for the first SIM card; after adding the secondary carrier for the first SIM card in response to the first RRC connection reconfiguration signaling, the terminal receives a switching operation of switching a data service from the first SIM card to the second SIM card; in response to the switching operation, the terminal sets the first SIM card to support the second radio frequency capability, sets the second SIM card to support the first radio frequency capability, and skips reporting the UE capability information of the first SIM card and the UE capability information of the second SIM card again to the network side device; the terminal releases a radio frequency channel occupied by the secondary carrier of the first SIM card; the terminal receives second RRC connection reconfiguration signaling that is sent by the network side device and that is for the second SIM card, where the second RRC connection reconfiguration signaling is used to add a secondary carrier for the second SIM card; and in response to the second RRC connection reconfiguration signaling, the terminal configures a radio frequency channel for the secondary carrier of the second SIM card, and adding the secondary carrier of the second SIM card.

According to the radio frequency channel sharing method provided in this application, the terminal may report a same radio frequency capability when each SIM card registers with the network side and reports the UE capability information, and the terminal may dynamically allocate a radio frequency channel resource to each SIM card. When the terminal switches the data service from the first SIM card to the second SIM card, the terminal 100 may actively request, to the network side by using the first SIM card, to release a secondary carrier on the first SIM card, and release the radio frequency channel resource occupied by the secondary carrier on the first SIM card. Then the terminal adds the secondary carrier for the second SIM card, and configures the radio frequency channel resource required by the secondary carrier on the second SIM card. In this way, when the data service is switched between the different SIM cards, the terminal does not need to initiate a deregistration procedure and a registration procedure, thereby reducing a switching time.

In a possible implementation, that the terminal adds the secondary carrier for the first SIM card includes: The terminal finds, through measurement, that a signal strength of a secondary cell of the first SIM card is a first value; and the terminal sends a first measurement report to the network side device by using the first SIM card, where the signal strength of the secondary cell of the first SIM card in the second measurement report is a preset value, the preset value is less than the first value, and the second measurement report is used to trigger the network side device to release the secondary carrier of the first SIM card.

In a possible implementation, the method further includes: When the terminal determines that the radio frequency channel that is not configured on the terminal does not include the radio frequency channel required by the secondary carrier of the first SIM card, the terminal finds, through measurement, that a signal strength of a secondary cell of the first SIM card is a first value; and the terminal sends a second measurement report to the network side device by using the first SIM card, where the signal strength of the secondary cell of the first SIM card in the second measurement report is a preset value, the preset value is less than the first value, and the second measurement report is used to trigger the network side device to release the secondary carrier of the first SIM card.

In a possible implementation, the method further includes: The terminal reports a third measurement report to the network side device in response to the switching operation, where a signal strength of a secondary cell of the first SIM card in the third measurement report is a preset value, and the third measurement report is used to indicate the network side device to release the secondary carrier of the first SIM card.

In a possible implementation, after the terminal receives the second RRC connection reconfiguration signaling, the method further includes: The terminal determines, based on a band combination of the secondary carrier in the second RRC connection reconfiguration signaling and a quantity of MIMO layers on each band, a radio frequency channel required by the secondary carrier of the second SIM card; and when the terminal determines that a radio frequency channel that is not configured on the terminal includes the radio frequency channel required by the secondary carrier of the first SIM card, the terminal configures the required radio frequency channel for the second SIM card, and adds the secondary carrier for the second SIM card.

In a possible implementation, the method further includes: The terminal finds, through measurement, that a signal strength of a secondary cell of the second SIM card is a second value; and the terminal sends a fourth measurement report to the network side device by using the second SIM card, where the signal strength of the secondary cell of the second SIM card in the fourth measurement report is the second value, and the fourth measurement report is used to trigger the network side device to add the secondary carrier for the second SIM card.

In a possible implementation, the method further includes: When the terminal determines that the radio frequency channel that is not configured on the terminal does not include the radio frequency channel required by the secondary carrier of the second SIM card, the terminal finds, through measurement, that a signal strength of a secondary cell of the second SIM card is a second value; and the terminal sends a fifth measurement report to the network side device by using the second SIM card, where the signal strength of the secondary cell of the second SIM card in the fifth measurement report is a preset value, the preset value is less than the second value, and the fifth measurement report is used to trigger the network side device to release the secondary carrier of the second SIM card.

In a possible implementation, the method includes: the radio frequency capability information includes a band combination supporting carrier aggregation CA and a quantity of MIMO layers of each band, and both the first UE capability information and the second UE capability information includes one or more bandEUTRA information elements and a FeatureSet information element corresponding to each bandEUTRA information element, where the one or more bandEUTRA information elements indicate the band combination supporting CA, and the FeatureSet information element corresponding to each bandEUTRA information element indicates the quantity of the MIMO layers of each band.

According to a third aspect, this application provides a terminal. At least a first SIM card and a second SIM card are installed on the terminal. The terminal includes one or more processors and one or more memories. The one or more memories are coupled to the one or more processors, and are configured to store computer program code. The computer program code includes computer instructions, and when the one or more processors execute the computer instructions, a terminal is enabled to perform the method according to any one of the possible implementations of any one of the foregoing aspects.

According to a fourth aspect, an embodiment of this application provides a chip system, applied to a terminal that includes a first SIM card and a second SIM card. The chip system includes an application processor and a baseband processor. The application processor and the baseband processor are configured to invoke instructions from a memory, and run the instructions stored in the memory, so that the terminal performs the radio frequency channel sharing method in any one of the possible implementations of any one of the foregoing aspects.

According to a fifth aspect, an embodiment of this application provides a computer storage medium, including computer instructions. When the computer instructions are run on a terminal, the terminal is enabled to perform the radio frequency channel sharing method according to any one of the possible implementations of any of the foregoing aspects.

According to a sixth aspect, an embodiment of this application provides a computer program product. When the computer program product runs on a computer, the computer is enabled to perform the radio frequency channel sharing method according to any one of the possible implementations of any of the foregoing aspects.

DESCRIPTION OF EMBODIMENTS

The following clearly describes technical solutions in embodiments of this application in detail with reference to the accompanying drawings. In the descriptions of embodiments of this application, unless otherwise specified, "/" indicates "or". For example, A/B may indicate A or B. The term "and/or" in this specification merely describes an association relationship between associated objects, and indicates that three relationships may exist. For example, A and/or B may indicate the following three cases: Only A exists, both A and B exist, and only B exists. In addition, in the descriptions of embodiments of this application, "a plurality of" means two or more.

The following terms "first" and "second" are merely used for description, and shall not be understood as an indication or implication of relative importance or implicit indication of a quantity of indicated technical features. Therefore, a feature limited by "first" or "second" may explicitly or implicitly include one or more features. In the descriptions of embodiments of this application, unless otherwise specified, "a plurality of" means two or more than two.

The following describes a network system architecture of a radio access network according to an embodiment of this application.

Figure 1:
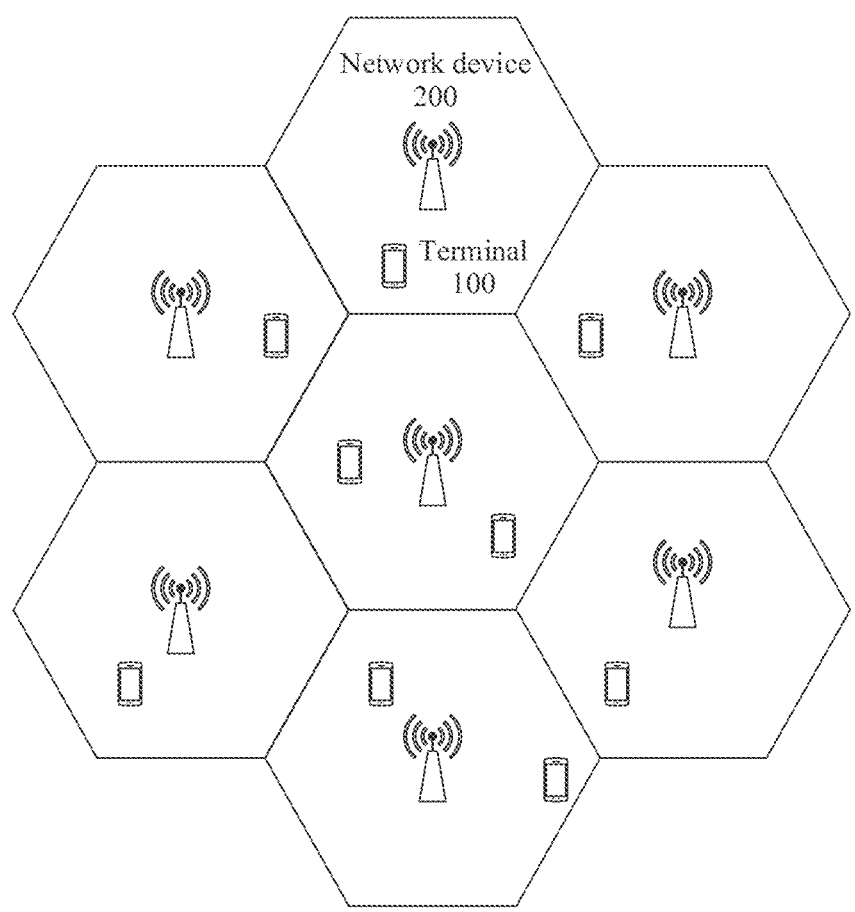
FIG. 1 is a schematic diagram of a network system architecture of a radio access network according to an embodiment of this application.

FIG. 1 is a schematic diagram of a network system architecture of a radio access network according to an embodiment of this application.

As shown in FIG. 1, a radio access network is divided into cellular cells. A terminal 100 in each cell is connected to a network device 200 in the cell through an air interface, and signaling exchange and data exchange are performed through the air interface. An access network may be based on a plurality of access technologies, and specifically depends on a network standard that is applied. For example, in an NR network of a 5th generation mobile network (5th generation mobile network, 5G), the network device 200 may be a next generation nodeB (next generation NodeB, gNB), and the network device 200 may apply a multiplexing method of orthogonal frequency division multiplexing access (orthogonal frequency division multiplexing access, OFDMA).

The network device 200 may be a device with a wireless transceiver function. The device includes but is not limited to: an evolved NodeB (evolved NodeB, eNB), a radio network controller (radio network controller, RNC), a NodeB (NodeB, NB), a base station controller (base station controller, BSC), a base transceiver station (base transceiver station, BTS), a home base station (for example, a home evolved NodeB, or home NodeB, HNB), a baseband unit (baseband unit, BBU), a gNB or a transmission point (TRP or TP) in a 5G NR network, or a network node forming the gNB or the transmission point, for example, a baseband unit (BBU), or a distribution unit (distribution unit, DU), and the like.

In some network deployments, a gNB may include a centralized unit (centralized unit, CU) and a DU. The gNB may further include a radio unit (radio unit, RU). The CU implements some functions of the gNB, and the DU implements some functions of the gNB. For example, the CU implements functions of a radio resource control (radio resource control, RRC) layer and a packet data convergence protocol (packet data convergence protocol, PDCP) layer. The DU implements functions of a radio link control (radio link control, RLC) layer, a media access control (media access control, MAC) layer, and a physical (physical, PHY) layer. Information at the RRC layer eventually becomes information at the PHY layer, or is converted from information at the PHY layer. Therefore, in the architecture, higher layer signaling such as RRC layer signaling or PHCP layer signaling may also be considered as signaling sent by the DU or sent by the DU and the RU. It may be understood that the network device 200 may be a CU node, a DU node, or a device including a CU node and a DU node. In addition, the CU may be classified as a network device in an access network RAN, or the CU may be classified as a network device in a core network (core network, CN). This is not limited herein.

The terminal 100 may also be referred to as user equipment (user equipment, UE), an access terminal, a subscriber unit, a subscriber station, a mobile station, a mobile console, a remote station, a remote terminal, a mobile device, a user terminal, a terminal, a wireless communication device, a user agent, or a user apparatus. The terminal device in embodiments of this application may be a mobile phone (mobile phone), a tablet computer (Pad), a computer having a wireless transceiver function, a virtual reality (virtual reality, VR) terminal device, an augmented reality (augmented reality, AR) terminal device, a wireless terminal in industrial control (industrial control), a wireless terminal in self-driving (self-driving), a wireless terminal in remote medical (remote medical), a wireless terminal in a smart grid (smart grid), a wireless terminal in transportation safety (transportation safety), or the like. An application scenario is not limited in embodiments of this application.

Figure 2A:
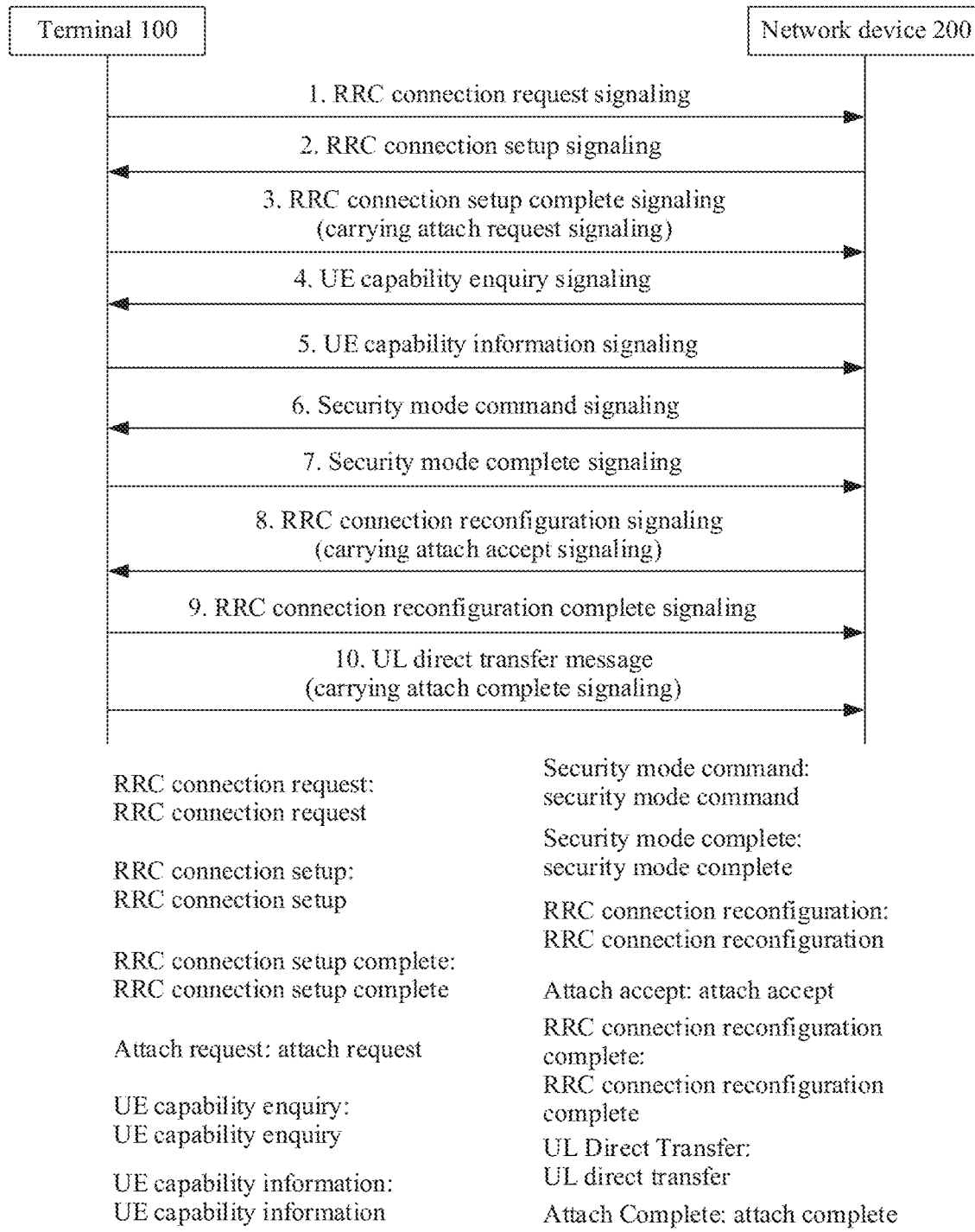
FIG. 2A is a schematic diagram of a signaling procedure of registering a terminal with a network device according to an embodiment of this application.

FIG. 2A is a schematic diagram of a signaling procedure of registering a terminal 100 with a network device 200 according to an embodiment of this application.

As shown in FIG. 2A, a signaling procedure in which a terminal 100 registers with a network device 200 includes the following steps.

1. The terminal 100 sends radio resource control (radio resource control, RRC) connection request (RRC Connection Request) signaling to the network device 200.

2. After receiving the RRC connection request signaling sent by the terminal 100, the network device 200 returns RRC connection setup (RRC Connection Setup) signaling to the terminal 100.

3. After receiving the RRC connection setup signaling, the terminal 100 may return RRC connection setup complete signaling to the network device 200.

The RRC connection setup signaling includes registration request (Attach Request) signaling of a non-access stratum.

4. After receiving the attach request signaling, the network device 200 may send UE capability enquiry (UE Capability Enquiry) signaling to the terminal 100 to initiate a capability enquiry procedure for the terminal 100.

5. After receiving the UE capability enquiry signaling, the terminal 100 may send UE capability information (UE Capability Information) signaling to the network device 200 to report capability information of the terminal 100.

The capability information of the terminal 100 includes radio frequency capability information. The radio frequency capability information includes a band combination supported by the terminal 100, a quantity of uplink and downlink MIMO layers of each band supported by the terminal in each band combination, and the like.

6. After the terminal 100 reports the UE capability information, the terminal 100 and the network device 200 enter a security mode procedure. The network device 200 may send security mode command (Security Mode Command) signaling to the terminal 100, to start a security mode control (Security Mode Control, SMC) procedure between the terminal 100 and the network device 200 (including negotiation of a used security algorithm, generation of a key required by a corresponding security algorithm, initialization of secure message interaction between the network device 200 and the terminal 100, and the like).

7. After completing the SMC procedure, the terminal 100 returns security mode complete (Security Mode Complete) signaling to the network device 200, to notify the network device 200 that the SMC procedure is completed.

8. After completing the SMC procedure, the network device 200 sends RRC connection reconfiguration (RRC Connection Reconfiguration) signaling to the terminal 100 to start an RRC reconfiguration procedure.

The RRC connection reconfiguration signaling carries non-access stratum registration accept (Attach Accept) signaling. The registration accept signaling is used to notify the terminal 100 that the network device 200 accepts registration of the terminal 100.

9. After receiving the RRC connection reconfiguration signaling, the terminal 100 may send RRC connection reconfiguration complete (RRC Connection Reconfiguration Complete) signaling to the network device 200.

10. After completing the RRC reconfiguration procedure, the terminal 100 may send an uplink direct transfer (UL Direct Transfer) message to the network device 200. The UL direct transfer message carries non-access stratum registration complete (Attach Complete) signaling. The attach complete signaling is used to notify the network device 200 that the current registration procedure of the terminal 100 is completed.

Figure 2B:
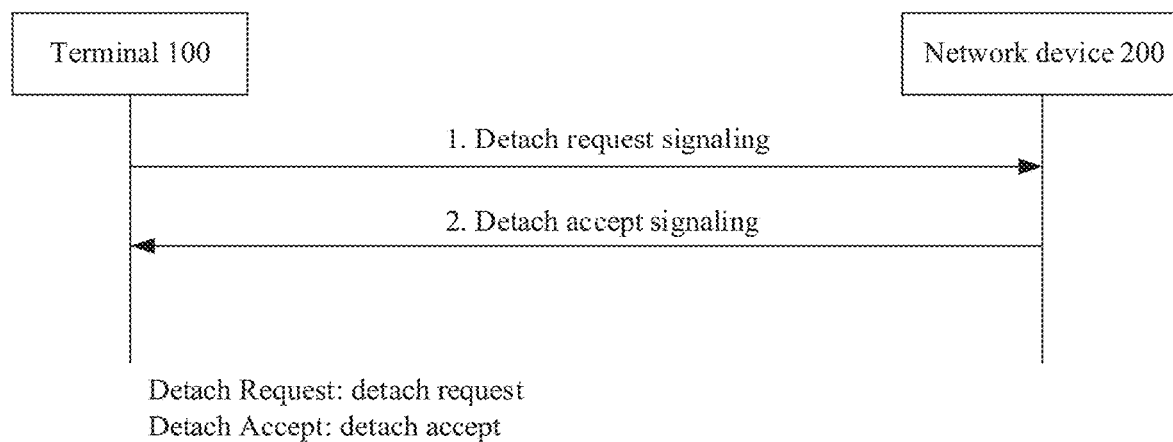
FIG. 2B is a schematic diagram of a signaling procedure of deregistering a terminal from a network device according to an embodiment of this application.

FIG. 2B is a schematic diagram of signaling procedure of deregistering a terminal 100 from a network device 200 according to an embodiment of this application.

As shown in FIG. 2B, a signaling procedure of deregistering the terminal 100 from the network device 200 may include the following steps.

1. The terminal 100 sends deregistration request (Detach Request) signaling to the network device 200.

2. After receiving the deregistration request of the terminal 100, the network device 200 clears a registration resource of the terminal 100, and returns deregistration accept (Detach Accept) signaling to the terminal 100.

Generally, the network device 200 re-inquires capability information of the terminal 100 only when the terminal 100 performs registration or cell handover occurs. Therefore, if a capability (for example, a radio frequency capability) of the terminal 100 changes, the terminal 100 needs to re-initiate a deregistration procedure and a registration procedure, and then the terminal 100 can have an opportunity to re-report the capability information of the terminal 100.

When a primary SIM card and a secondary SIM card on the terminal 100 have different radio frequency specifications, the primary SIM card and the secondary SIM card of the terminal 100 have different radio frequency capabilities.

For example, radio frequency channels (which may be used to transmit and receive signals) of the terminal 100 include: four radio frequency channels on a band B1, four radio frequency channels on a band B3, and four radio frequency channels on a band B7. When a SIM card 1 is set to a data service SIM card (that is, a default SIM card), a radio frequency capability reported by a modem module corresponding to the SIM card 1 in UE capability information may include the following CA band combinations; 1. a CA band combination of a two-layer MIMO capability of the band B1+a four-layer MIMO capability of the band B3+a four-layer MIMO capability of the band B7; 2. a band combination of a four-layer MIMO capability of the band B1+a two-layer MIMO capability of the band B3+the four-layer MIMO capability of the band B7; 3. a CA band combination of the four-layer MIMO capability of the band B1+the four-layer MIMO capability of the band B3+a two-layer MIMO capability of the band B7; and fallback band combinations (fallback band combinations) of the foregoing three band combinations. A SIM card 2 supports only a voice capability, and a radio frequency capability reported by a modem module corresponding to the SIM card 2 in UE capability information may include the following CA band combination: the two-layer MIMO capability of the band B1+the two-layer MIMO capability of the band B3+the two-layer MIMO capability of the band B7. After receiving the UE capability information of the SIM card 1, a network side may add a secondary carrier for the SIM card 1 based on the CA band combination supported by the SIM card 1. After receiving the UE capability information of the SIM card 2, the network side determines that the CA band combination supported by the SIM card 2 cannot support adding a secondary carrier of four-layer MIMO of the band B1+four-layer MIMO of the band B3. The foregoing example is merely used to explain this application and shall not be construed as a limitation.

When the services of the primary SIM card and the secondary SIM card of the terminal 100 are exchanged, and the data service is switched from the primary SIM card to the secondary SIM card, a radio frequency capability of the modem (modem) module corresponding to each SIM card changes as the data service is switched between the SIM cards. In this case, the terminal 100 needs to initiate, on the modem module corresponding to each SIM card, a deregistration procedure to a network side accessed by the modem module, and then perform re-registration, to complete reporting of UE capability information of the modem module corresponding to each SIM card. As a result, when the data service is switched between the primary SIM card and the secondary SIM card, switching is slow, and the data service is interrupted.

When the terminal 100 applies a DSDA solution, the terminal 100 needs to configure two same sets of radio frequency channels for the primary SIM card and the secondary SIM card, which are used for the primary SIM card and the secondary SIM card. In this way, radio frequency specifications of the primary SIM card and the secondary SIM card are the same. When the data service is switched between the two SIM cards, the UE capability information does not need to be reported again, and the deregistration and registration procedures do not need to be implemented. Switching is fast and service interruption does not occur. However, because the secondary SIM card supports only the voice service, a small quantity of radio frequency channels are needed. As a result, most radio frequency channels of the secondary SIM card are idle, resulting in low radio frequency resource utilization and high hardware costs of the terminal.

When the terminal 100 applies a DSDS solution, only a single-active capability is supported. In this case, only one set of radio frequency resources is required, and a SIM card performing a service occupies the entire set of radio frequency resources. Because the radio frequency specifications of the two SIM cards are the same, when the data service is switched between the two SIM cards, a terminal capability does not need to be reported again, and the deregistration and registration procedures are not required. Therefore, switching is fast. However, the terminal 100 does not have a dual-active capability. Therefore, when the secondary SIM card is used for a voice call, the primary SIM card cannot perform the data service.

Therefore, an embodiment of this application provides a radio frequency channel sharing method. The terminal 100 may report a same radio frequency capability when a modem module corresponding to each SIM card registers with a network side and reports UE capability information, and the terminal 100 may dynamically allocate a radio frequency resource to each modem module. When the radio frequency channel resource required for secondary carrier configuration is not allocated to the modem module, the modem module may return a configuration failure indication message to a network side device, and notify the network side to release a secondary carrier. When the radio frequency channel resource required for secondary carrier configuration is allocated to the modem module, the modem module may report an actual signal measurement value of a secondary cell to the network side, to trigger the network side to complete adding of the secondary cell for the modem module. In this way, when the data service is switched between the different SIM cards, the terminal does not need to initiate a deregistration procedure and a registration procedure, thereby reducing a switching time.

Figure 3:
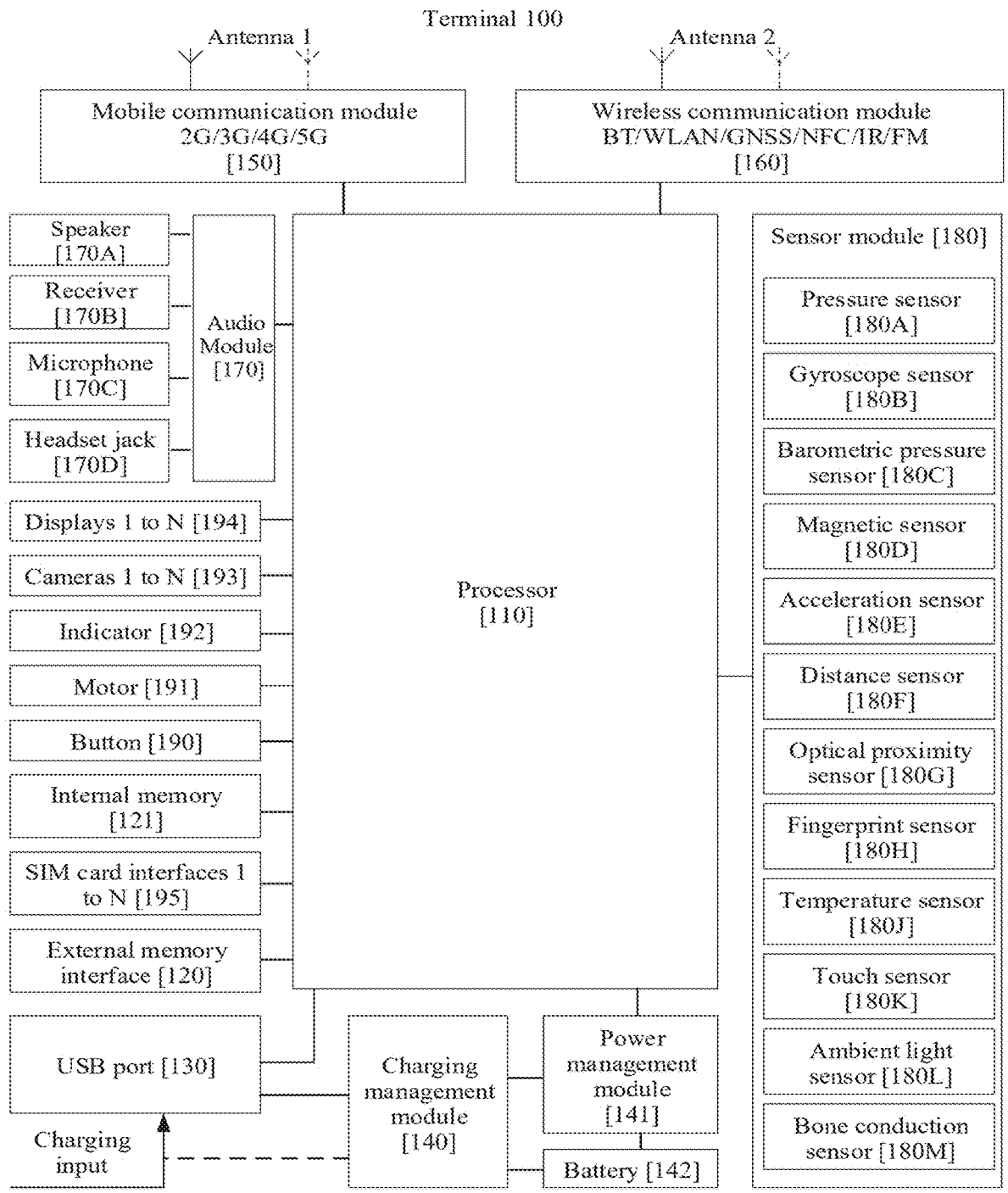
FIG. 3 is a schematic diagram of a hardware structure of a terminal according to an embodiment of this application.

FIG. 3 is a schematic diagram of a structure of a terminal 100.

The following uses the terminal 100 as an example to specifically describe this embodiment. It should be understood that the terminal 100 shown in FIG. 3 is merely an example. The terminal 100 may have more or fewer components than those shown in FIG. 3, or two or more components may be combined, or a different component configuration may be used. Various parts shown in FIG. 3 may be implemented in hardware including one or more signal processing and/or application-specific integrated circuits, software, or a combination of hardware and software.

The terminal 100 may include a processor 110, an external memory interface 120, an internal memory 121, a universal serial bus (universal serial bus, USB) port 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display screen 194, a subscriber identity module (subscriber identity module, SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in this embodiment of the present invention does not constitute a specific limitation on the terminal 100. In some other embodiments of this application, the terminal 100 may include more or fewer components than those shown in the figure, or some components may be combined, or some components may be split, or there may be a different component layout. The components shown in the figure may be implemented by using hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, a neural-network processing unit (neural-network processing unit, NPU), and/or the like. Different processing units may be independent components, or may be integrated into one or more processors.

The controller may be a nerve center and a command center of the terminal 10. The controller may generate an operation control signal based on instruction operation code and a time sequence signal, to control instruction reading and instruction execution.

A memory may be further disposed in the processor 110, and is configured to store instructions and data. In some embodiments, the memory in the processor 110 is a cache memory. The memory may store instructions or data that has been used or cyclically used by the processor 110. If the processor 110 needs to use the instructions or the data again, the processor may directly invoke the instructions or the data from the memory. This avoids repeated access, reduces waiting time of the processor 110, and improves system efficiency.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) port, and/or the like.

It may be understood that the interface connection relationship between the modules shown in this embodiment of the present invention is merely an example for description, and does not constitute a limitation on the structure of the terminal 100. In some other embodiments of this application, the terminal 100 may alternatively use an interface connection manner different from that in the foregoing embodiment, or a combination of a plurality of interface connection manners.

The charging management module 140 is configured to receive a charging input from a charger. The charger may be a wireless charger or a wired charger. In some embodiments in which wired charging is performed, the charging management module 140 may receive a charging input from the wired charger through the USB port 130. In some embodiments in which wireless charging is performed, the charging management module 140 may receive a wireless charging input through a wireless charging coil of the terminal 100. The charging management module 140 may further supply power to the electronic device by using the power management module 141 when charging the battery 142.

The power management module 141 is configured to connect the battery 142, the charging management module 140, and the processor 110. The power management module 141 receives an input of the battery 142 and/or an input of the charging management module 140, to supply power to the processor 110, the internal memory 121, an external memory, the display screen 194, the camera 193, the wireless communication module 160, and the like. The power management module 141 may be further configured to monitor parameters such as a battery capacity, a battery cycle count, and a battery health status (electric leakage or impedance). In some other embodiments, the power management module 141 may alternatively be disposed in the processor 110. In some other embodiments, the power management module 141 and the charging management module 140 may alternatively be disposed in a same device.

A wireless communication function of the terminal 100 may be implemented through the antenna 1, the antenna 2, the mobile communication module 150, the wireless communication module 160, the modem processor, the baseband processor, and the like.

The antenna 1 and the antenna 2 are configured to transmit and receive an electromagnetic wave signal. Each antenna in the terminal 100 may be configured to cover one or more communication bands. Different antennas may be reused to improve antenna utilization. For example, the antenna 1 may be reused as a diversity antenna in a wireless local area network. In some other embodiments, the antenna may be used in combination with a tuning switch.

The mobile communication module 150 may provide a solution to wireless communication such as 2G/3G/4G/5G applied to the terminal 100. The mobile communication module 150 may include at least one filter, a switch, a power amplifier, a low noise amplifier (low noise amplifier, LNA), and the like. The mobile communication module 150 may receive an electromagnetic wave through the antenna 1, perform processing such as filtering or amplification on the received electromagnetic wave, and transmit the electromagnetic wave to the modem processor for demodulation. The mobile communication module 150 may further amplify, a signal modulated by the modem processor, and convert the signal into an electromagnetic wave for radiation through the antenna 1. In some embodiments, at least some functional modules in the mobile communication module 150 may be disposed in the processor 110. In some embodiments, at least some functional modules in the mobile communication module 150 and at least some modules in the processor 110 may be disposed in a same device.

The modem processor may include a modulator and a demodulator. The modulator is configured to modulate a to-be-sent low-frequency baseband signal into a medium-frequency or high-frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor and then transmitted to the application processor. The application processor outputs a sound signal by an audio device (which is not limited to the speaker 170A, the receiver 170B, or the like), or displays an image or a video by using the display screen 194. In some embodiments, the modem processor may be an independent component. In some other embodiments, the modem processor may be independent of the processor 110, and is disposed in a same device with the mobile communication module 150 or another functional module.

The wireless communication module 160 may provide a solution to wireless communication applied to the mobile phone 100, for example, a wireless local area network (wireless local area network, WLAN) (for example, a wireless fidelity (wireless fidelity, Wi-Fi) network), bluetooth (bluetooth, BT), a global navigation satellite system (global navigation satellite system, GNSS), frequency modulation (frequency modulation, FM), near field communication (near field communication, NFC), and infrared (infrared, IR). The wireless communication module 160 may be one or more components to which at least one communication processor module is integrated. The wireless communication module 160 receives an electromagnetic wave through the antenna 2, performs frequency modulation and filtering processing on an electromagnetic wave signal, and sends a processed signal to the processor 110. The wireless communication module 160 may further receive a to-be-sent signal from the processor 110, perform frequency modulation and amplification on the signal, and convert the signal into an electromagnetic wave for radiation through the antenna 2.

In some embodiments, the antenna 1 of the terminal 100 is coupled to the mobile communication module 150, and the antenna 2 is coupled to the wireless communication module 160, so that the terminal 100 may communicate with a network and another device by using a wireless communication technology. The wireless communication technology may include technologies such as a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-CDMA), long term evolution (long term evolution, LTE), BT, a GNSS, a WLAN, NFC, FM, and/or IR. The GNSS may include a global positioning system (global positioning system, GPS), a global navigation satellite system (global navigation satellite system, GLONASS), a BeiDou navigation satellite system (BeiDou navigation satellite system, BDS), a quasi-zenith satellite system (quasi-zenith satellite system, QZSS), and/or a satellite based augmentation system (satellite based augmentation systems, SBAS).

The terminal 100 may implement a display function by using the GPU, the display screen 194, the application processor, and the like. The GPU is a microprocessor for image processing, and is connected to the display screen 194 and the application processor. The GPU is configured to: perform mathematical and geometric computation, and render an image. The processor 110 may include one or more GPUs, which execute program instructions to generate or change display information.

The display screen 194 is configured to display an image, a video, and the like. The display screen 194 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flexible light-emitting diode, FLED), a mini-LED, a micro-LED, a micro-OLED, a quantum dot light emitting diode (quantum dot light emitting diode, QLED), or the like. In some embodiments, the terminal 100 may include one or L display screens 194, where L is a positive integer greater than 1.

The terminal 100 may implement a photographing function by using the ISP, the camera 193, the video codec, the GPU, the display screen 194, the application processor, and the like.

The ISP is configured to process data fed back by the camera 193. For example, during photographing, when a shutter is open, light is transmitted to a photosensitive element of the camera through a lens. An optical signal is converted into an electrical signal. The photosensitive element of the camera transmits the electrical signal to the ISP for processing, and converts the electrical signal into a visible image. The ISP may further perform algorithm optimization on noise, luminance, and complexion of an image. The ISP may further optimize parameters such as exposure and a color temperature of a photographing scenario. In some embodiments, the ISP may be disposed in the camera 193.

The camera 193 is configured to capture a static image or a video. An optical image of an object is generated through the lens, and is projected onto the photosensitive element. The photosensitive element may be a charge coupled device (charge coupled device, CCD) or a complementary metal-oxide-semiconductor (complementary metal-oxide-semiconductor, CMOS) phototransistor. The light-sensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal in a standard format like RGB or YUV. In some embodiments, the terminal 100 may include one or N cameras 193, where N is a positive integer greater than 1.

The digital signal processor is configured to process a digital signal. In addition to processing a digital image signal, the digital signal processor may also process other digital signals. For example, when the terminal 100 selects a frequency, the digital signal processor is configured to perform Fourier transformation on frequency energy.

The video codec is configured to compress or decompress a digital video. The terminal 100 may support one or more video codecs. In this way, the terminal 100 may play or record videos in a plurality of coding formats, for example, moving picture experts group (moving picture experts group, MPEG)-1, MPEG-2, MPEG-3, and MPEG-4.

The NPU is a neural-network (neural-network, NN) computation processor. The NPU quickly processes input information by referring to a structure of a biological neural network, for example, by referring to a mode of transmission between human brain neurons, and continuously performs self-learning. Applications such as intelligent cognition of the terminal 100 may be implemented by using the NPU, for example, image recognition, facial recognition, speech recognition, and text understanding may be implemented.

The external memory interface 120 may be used to connect an external memory card, for example, a micro SD card, to extend storage of the terminal 100. The external memory card communicates with the processor 110 through the external memory interface 120, to implement a data storage function. For example, files such as music and a video are stored in the external memory card.

The internal memory 121 may be configured to store computer-executable program code. The executable program code includes instructions. The processor 110 runs the instructions stored in the internal memory 121, to implement various function applications and data processing of the terminal 100. The internal memory 121 may include a program storage area and a data storage area. The program storage area may store an operating system, an application required by at least one function (for example, a voice playing function or an image playing function), and the like. The data storage area may store data (for example, audio data and contacts) and the like created when the terminal 100 is used. In addition, the internal memory 121 may include a high-speed random access memory, and may further include a non-volatile memory, for example, at least one magnetic disk storage device, a flash storage device, or a universal flash storage (universal flash storage, UFS).

The terminal 100 may implement audio functions such as music playing and recording by using the audio module 170, the speaker 170A, the receiver 170B, the microphone 170C, the headset jack 170D, the application processor.

The audio module 170 is configured to convert digital audio information into an analog audio signal for output, and is also configured to convert analog audio input into a digital audio signal.

The speaker 170A, also referred to as a "loudspeaker", is configured to convert an audio electrical signal into a sound signal.

The receiver 170B, also referred to as an "earpiece", is configured to convert an electrical audio signal into a sound signal.

The microphone 170C, also referred to as a "mike" or a "mic", is configured to convert a sound signal into an electrical signal.

The pressure sensor 180A is configured to sense a pressure signal, and can convert the pressure signal into an electrical signal. In some embodiments, the pressure sensor 180A may be disposed on the display screen 194. The gyro sensor 180B may be configured to determine a motion posture of the terminal 100. The barometric pressure sensor 180C is configured to measure barometric pressure. The magnetic sensor 180D includes a Hall sensor, and opening and closing of a flip cover may be detected by using the magnetic sensor 180D. The acceleration sensor 180E may detect magnitudes of accelerations of the terminal 100 in various directions (usually on three axes). The distance sensor 180F is configured to measure a distance. The optical proximity sensor 180G may also be used in a flip cover mode or a pocket mode to automatically unlock or lock the screen. The ambient light sensor 180L is configured to sense ambient light brightness. The fingerprint sensor 180H is configured to collect a fingerprint. The temperature sensor 180J is configured to detect a temperature. The touch sensor 180K is also referred to as a "touch panel". The touch sensor 180K may be disposed on the display screen 194, and the touch sensor 180K and the display screen 194 constitute a touchscreen, which is also referred to as a "touch screen". The touch sensor 180K is configured to detect a touch operation performed on or near the touch sensor. The touch sensor may transfer the detected touch operation to the application processor to determine a type of the touch event. A visual output related to the touch operation may be provided through the display screen 194. In some other embodiments, the touch sensor 180K may alternatively be disposed on a surface of the terminal 100 at a position different from that of the display screen 194. The bone conduction sensor 180M may obtain a vibration signal. The button 190 includes a power button, a volume button, and the like. The motor 191 may generate a vibration prompt. The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted into the SIM card interface 195 or detached from the SIM card interface 195, to implement contact with or separation from the terminal 100. The terminal 100 may support N SIM card interfaces, where N is a positive integer greater than or equal to 2. The SIM card interface 195 may support a nano-SIM card, a micro-SIM card, a SIM card, and the like. A plurality of SIM cards may be inserted into a same SIM card interface 195 at the same time. The plurality of SIM cards may be of a same type or different types. Different types of SIM cards maybe compatible in the SIM card interface 195. The SIM card interface 195 is also compatible with an external storage card. The terminal 100 interacts with a network through the SIM card, to implement functions such as calling and data communication. In some embodiments, the terminal 100 uses an eSIM, that is, an embedded SIM card. The eSIM card may be embedded in the terminal 100, and cannot be separated from the terminal 100.

Figure 4:
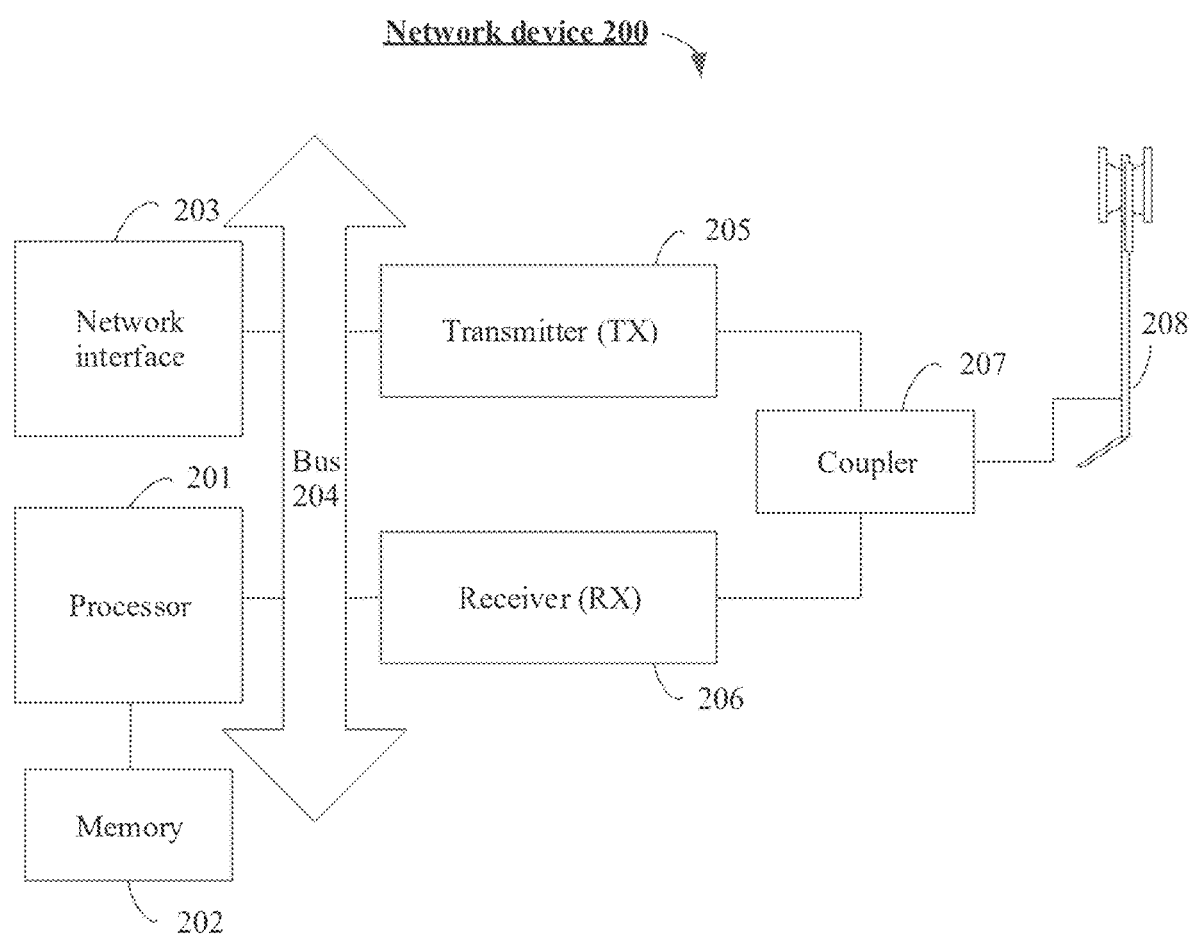
FIG. 4 is a schematic diagram of a hardware structure of a network device 200 according to an embodiment of this application.

FIG. 4 is a schematic diagram of a structure of a network device 200 according to an embodiment of this application.

As shown in FIG. 4, the network device 200 may include one or more processors 201, a memory 202, a network interface 203, a transmitter 205, a receiver 206, a coupler 207, and an antenna 208. These components may be connected by using a bus 204 or in another manner. In FIG. 4, for example, the components are connected by using the bus.

The network interface 203 may be used by the network device 200 for communicating with another communication device (for example, another network device).

The transmitter 205 may be configured to perform transmitting processing, for example, signal modulation, on a signal output by the processor 201. The receiver 206 may be configured to perform reception processing, for example, signal demodulation, on a mobile communication signal received by the antenna 208. In some embodiments of this application, there may be one or more transmitters 205 and receivers 206. The antenna 208 may be configured to convert electromagnetic energy in a transmission line into an electromagnetic wave in free space, or convert an electromagnetic wave in the free space into electromagnetic energy in the transmission line. The coupler 207 may be configured to split a mobile communication signal into a plurality of signals, and distribute the plurality of signals to the plurality of receivers 206.

The memory 202 may be coupled to the processor 201 through the bus 204 or an input/output port, or the memory 202 may be integrated with the processor 201. The memory 302 may be configured to store various software programs and/or a plurality of groups of instructions. Specifically, the memory 202 may include a high-speed random access memory, or a non-volatile memory, for example, one or more disk storage devices, a flash memory device, or another non-volatile solid-state storage device. The memory 202 may store an operating system, for example, an embedded operating system like uCOS, VxWorks, or RTLinux. The memory 202 may further store a network communication program. The network communication program may be used to communicate with one or more additional devices, one or more terminals, and one or more network devices.

In this embodiment of this application, the processor 201 may be configured to read and execute computer-readable instructions. Specifically, the processor 301 may be configured to invoke a program stored in the memory 202, for example, a program for implementing, on a network device 200 side, the radio frequency channel sharing method according to one or more embodiments of this application, and execute instructions included in the program.

It should be noted that the network device 200 shown in FIG. 4 is merely an implementation of this application. In actual application, the network device 200 may include more or fewer components. This is not limited herein.

The following describes a schematic diagram of a structure of a terminal 100 according to another embodiment of this application.

Figure 5:
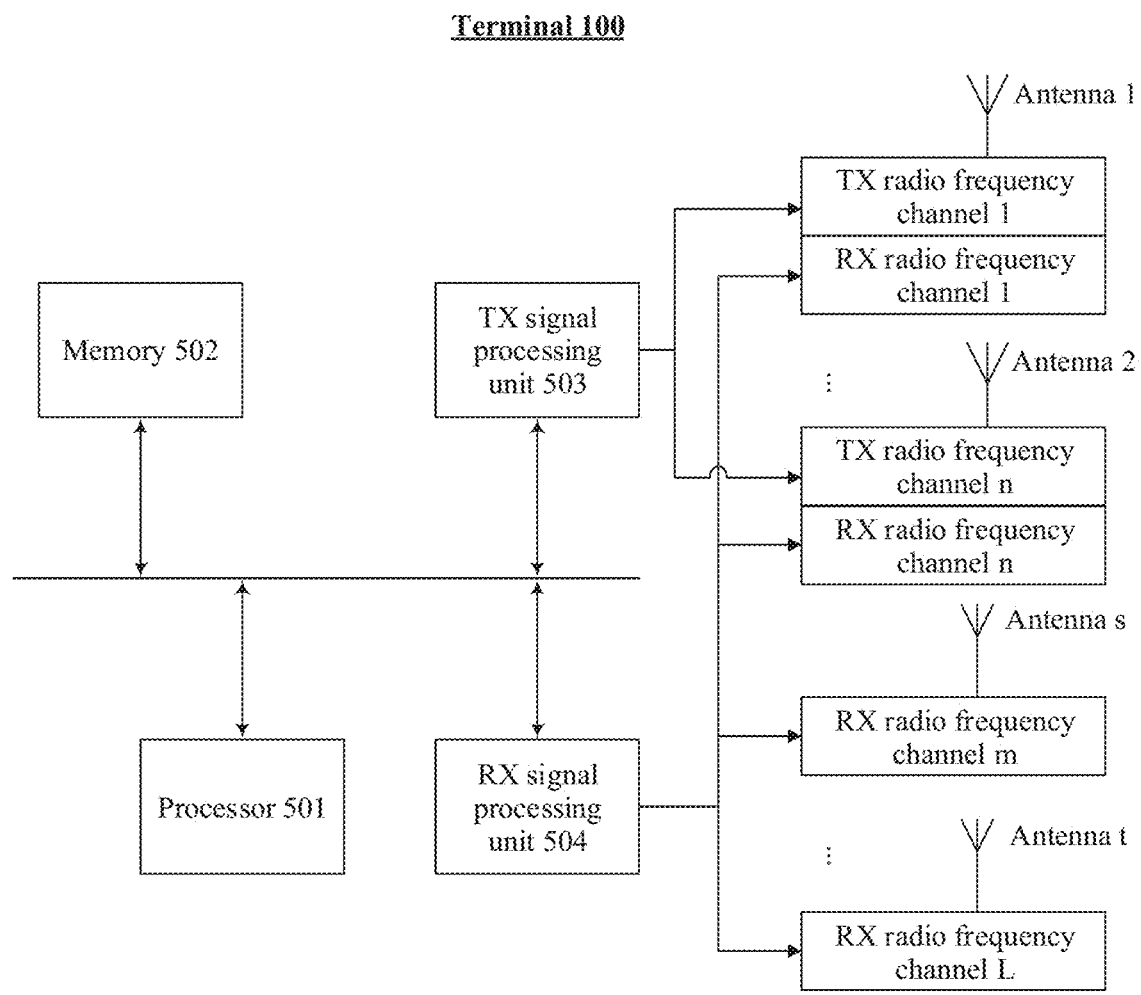
FIG. 5 is a schematic diagram of a hardware structure of a terminal according to another embodiment of this application.

As shown in FIG. 5, the terminal 100 may include a processor 501, a memory 502, a transmit (transmit, TX) signal processing unit 503, a receive (receive, RX) signal processing unit 504, n transmit (TX) radio frequency channels, m receive radio frequency channels, and t antennas, where n, m, and t are positive integers. The processor 501, the memory 502, the transmit (transmit, TX) signal processing unit 503, and the receive (receive, RX) signal processing unit 504 may be connected by using a communication bus.

The memory 502 may include a static memory configured to store executable code and data, or may include a dynamic memory configured to store instructions and dynamic data.

The processor 501 may be configured to control the TX signal processing unit 503 and the RX signal processing unit to send and receive signals in a predefined manner. In this embodiment of this application, the processor 501 may be configured to dynamically allocate a modem module applied for by each SIM card and a radio frequency channel resource applied for by each modem module. For specific content of dynamically allocating the modem module applied for by each SIM card and the radio frequency channel resource applied for by each modem module, refer to embodiments shown in FIG. 7A and FIG. 7B described below. Details are not described herein again.

The TX signal processing unit 503 may be configured to implement various signal processing functions for signal sending. The RX signal processing unit 504 may be configured to implement various signal processing functions for signal receiving.

The TX signal processing unit 503 and the RX signal processing unit 504 are respectively connected to the antenna by using a TX radio frequency channel and an RX radio frequency channel.

The TX radio frequency channel modulates a baseband signal to a carrier frequency and transmits the signal through the antenna.

The RX radio frequency channel demodulates a radio frequency signal received from an antenna array into a baseband signal, and sends the baseband signal to the RX signal processing unit 504 for processing. Some antennas can be configured to transmit and receive signals simultaneously, and therefore can be connected to both the TX and RX radio frequency channels. Some antennas are only configured to receive signals, and therefore are only connected to the RX radio frequency channel. In addition, the TX radio frequency channel and the RX radio frequency channel may be connected to any antenna, for example, a TX radio frequency channel 1 and an RX radio frequency channel 1 are connected to an antenna 2, and may be flexibly configured based on a service requirement.

The following describes a structure of a radio frequency channel in embodiments of this application.

Figure 6:
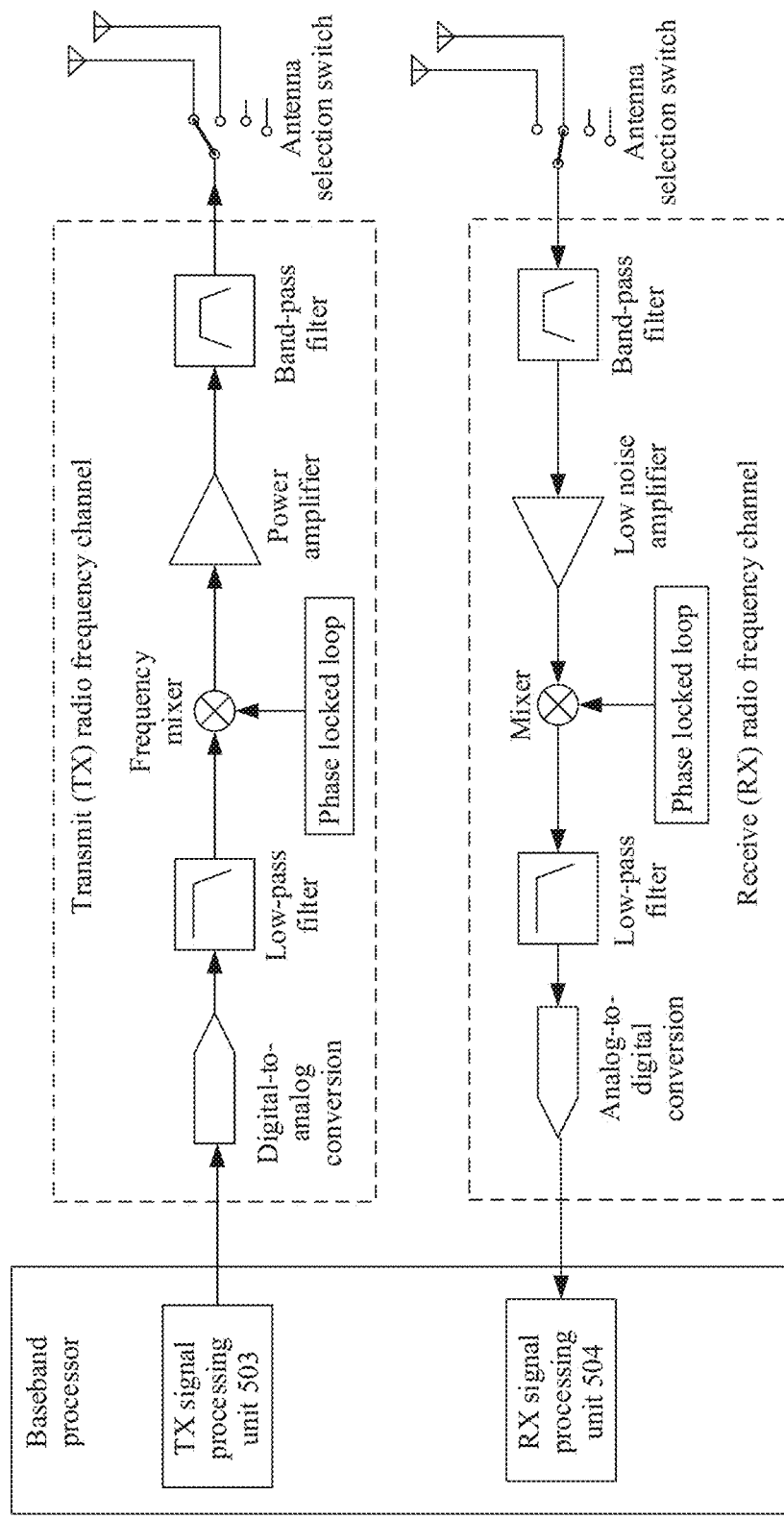
FIG. 6 is a schematic diagram of a structure of a radio frequency channel according to an embodiment of this application.

FIG. 6 is a schematic diagram of a structure of a radio frequency channel according to an embodiment of this application.

As shown in FIG. 6, on the TX radio frequency channel, a digital signal output by the TX signal processing unit 503 is converted into a low-frequency analog signal after digital-to-analog conversion, and then the low-frequency analog signal is modulated to a carrier by using a frequency mixer. A carrier signal is generated by a phase locked loop. A modulated high-frequency signal is amplified by a power amplifier, and then transmitted through the antenna.

On the RX radio frequency channel, the high-frequency signal received by the antenna is amplified by a low-noise amplifier, and then a high-frequency analog signal is down-converted into a low-frequency analog signal by the frequency mixer. Through analog-to-digital conversion, the signal is converted into a digital signal, and then transmitted to the RX signal processing unit 504 for signal receiving processing.

The terminal 100 may use a same radio frequency channel or use different radio frequency channels on different bands. If multiple-input multiple-output (Multi-Input Multi-Output, MIMO) is supported in uplink or downlink, the terminal 100 needs a plurality of uplink or downlink radio frequency channels. For example, if the terminal 100 supports a four-layer MIMO capability for downlink of a band, four receive channels are required by the band of the terminal 100. If the terminal 100 supports carrier aggregation (carrier aggregation, CA) or dual connectivity (dual connectivity, DC), the terminal 100 needs to simultaneously support a plurality of receive channels or transmit channels. For example, if the terminal 100 supports downlink CA on the band B1 and the band B3, and both the band B1 and the band B3 support a four-layer MIMO capability, the terminal 100 needs four receive channels of the B1 band and four receive channels of the B3 band.

The following describes a radio frequency channel sharing system according to an embodiment of this application.

Figure 7A:
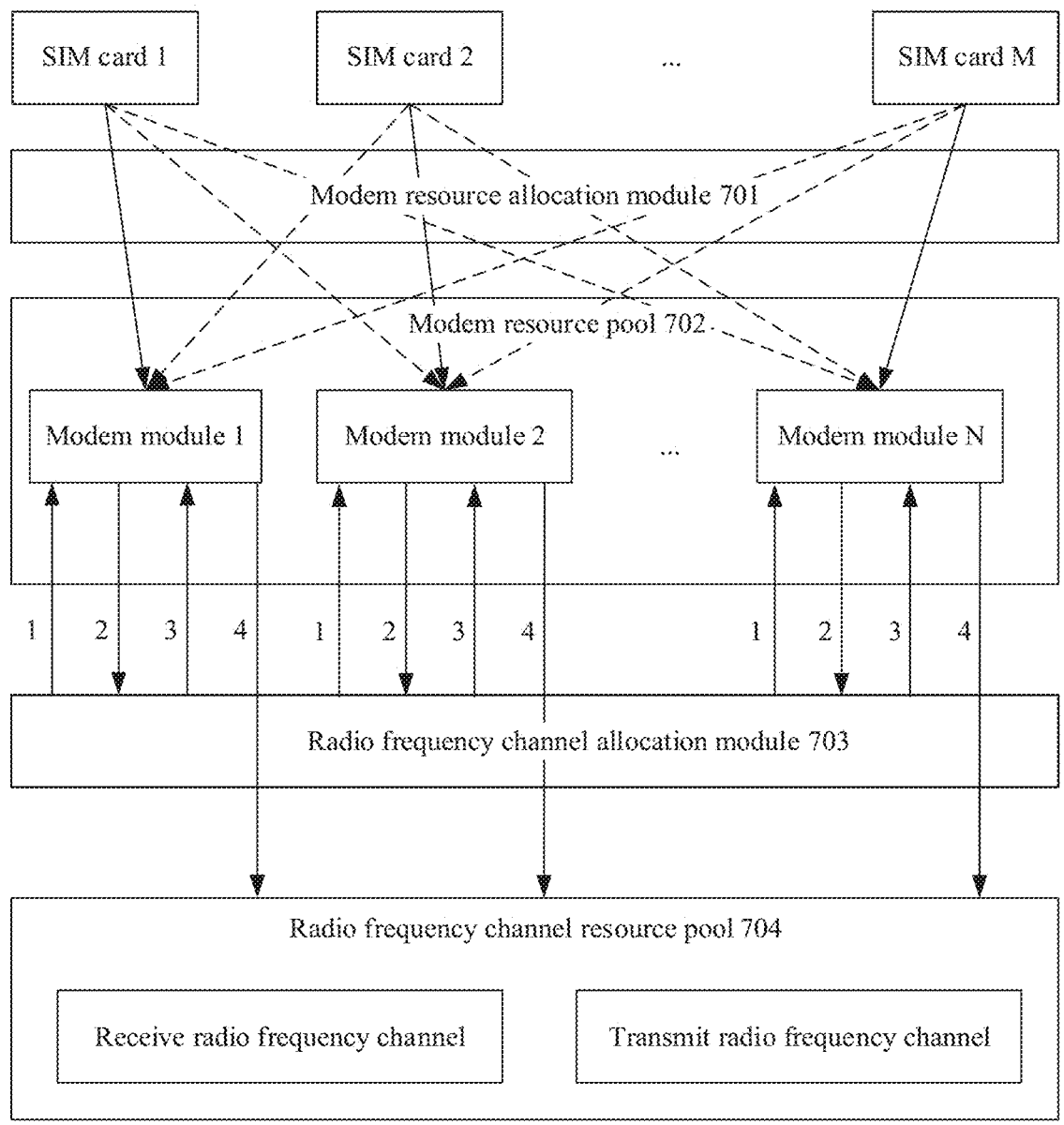
FIG. 7A is a schematic diagram of a structure of a radio frequency channel sharing system according to an embodiment of this application.

FIG. 7A is a schematic diagram of a structure of a radio frequency channel sharing system according to an embodiment of this application.

As shown in FIG. 7A, the terminal 100 includes M SIM cards, a modem resource allocation module 701, a modem resource pool 702, a radio frequency channel allocation module 703, and a radio frequency channel resource pool 704. The modem resource pool 702 may include N modem modules. The radio frequency channel resource pool 704 may include P transmit radio frequency channels and Q receive radio frequency channels, where M is a positive integer greater than or equal to 2, N is a positive integer greater than or equal to 2, and both P and Q are positive integers greater than 2.

In a possible implementation, a baseband chip on the terminal 100 may include protocol stacks of different access standards. For example, the baseband chip on the terminal 100 may include a 5G protocol stack, a 4G (LTE) protocol stack, a 3G protocol stack, and a 2G protocol stack. The baseband chip may be divided into a plurality of modem modules based on each protocol stack. Based on a corresponding protocol stack, the modem module may modulate a to-be-sent low-frequency baseband signal into a medium-frequency or high-frequency signal, or demodulate received electromagnetic wave signal into a low-frequency baseband signal. For example, when the terminal 100 supports dual SIM cards to simultaneously access a 5G network, the baseband chip on the terminal 100 may include a modem module 1 and a modem module 2 that work in a 5G protocol stack. When the SIM card 1 on the terminal 100 registers with the 5G access network, the terminal 100 may configure the modem module 1 for the SIM card 1. When the SIM card 2 on the terminal 100 registers with the 5G access network, the terminal 100 may configure the modem module 2 for the SIM card 2.

When the SIM card on the terminal 100 performs network search, the SIM card may apply to the modem resource allocation module 701 for a modem module. One modem module corresponds to one radio access standard. When the SIM card initiates a network search based on a specific radio access standard, the SIM card may apply to the modem resource allocation module for a modem module of the corresponding standard. For example, the modem module 1 may work based on the LTE network access standard, and the modem module 2 may work based on the 5G NR network access standard. When the SIM card 1 works based on the LTE network access standard, the SIM card 1 may apply to the modem resource allocation module for a modem module 1. When the SIM card 1 works based on the 5G network access standard, the SIM card 1 may apply to the modem resource allocation module for a modem module 2.

The terminal 100 may receive an operation of a user, and set a working standard of each SIM card. For example, the terminal 100 has a SIM card 1 and a SIM card 2. In response to a received user operation, the terminal 100 may set the SIM card 1 to work based on an LTE network radio access standard, and set the SIM card 2 to work based on a 5G NR network radio access standard. For another example, the terminal 100 may set, in response to a received user operation, that both the SIM card 1 and the SIM card 2 to work based on the 5G NR network radio access standard, or the like.

The interaction between each modem module and the radio frequency channel allocation module 703 and the radio frequency channel resource pool 704 may include the following steps.

1. When a SIM card of the terminal 100 registers with the network device 200, the radio frequency channel allocation module 703 may send radio frequency capability information of the terminal 100 to each modem module. The radio frequency capability information of the terminal 100 includes a band combination supporting carrier aggregation (carrier aggregation, CA) of the terminal 100 and MIMO capability information of each band combination. Radio frequency specifications received by all modem modules are the same.

For example, the terminal 100 supports downlink CA on the band B1 and the band B3, and both the band B1 and the band B3 support a four-layer MIMO capability. In this case, the radio frequency channel resource required by the terminal 100 is four receive channels of the band B1 and four receive channels of the band B3.

2. When the network device 200 configures a secondary carrier for a modem module by using RRC connection reconfiguration signaling, the modem module may apply to the radio frequency channel allocation module 703 for a radio frequency channel resource (including a transmit radio frequency channel and a receive radio frequency channel).

Figure 7B:
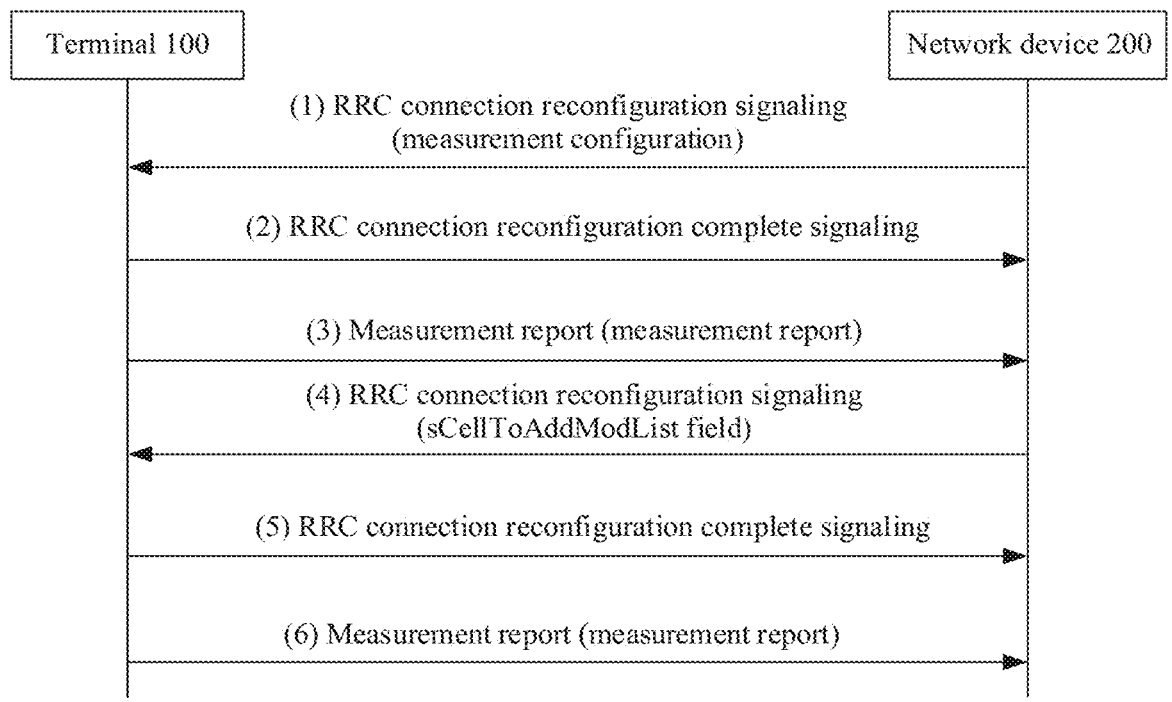
FIG. 7B is a schematic flowchart of configuring a secondary carrier for a terminal by a network device according to an embodiment of this application.

As shown in FIG. 7B, a procedure in which the network device 200 configures a secondary carrier for the terminal 100 may include the following steps.

(1) The network device 200 sends RRC connection reconfiguration signaling to the terminal 100, where the RRC connection reconfiguration signaling may be used to configure signal measurement performed by the terminal 100 on a secondary cell on the secondary carrier.

(2) After receiving the RRC connection reconfiguration signaling, the terminal 100 may complete measurement configuration, and return RRC connection reconfiguration signaling to the network device 200.

(3) The terminal 100 may periodically measure a signal quality of a secondary cell based on a measurement configuration, and report a signal measurement value of the secondary cell to the network device 200.

A signal quality measurement parameter of the secondary cell may include reference signal received power (reference signal received power, RSRP), and/or a signal to interference plus noise ratio (signal to interference plus noise ratio, SINR), and/or reference signal received quality (reference signal received quality, RSRQ) of the secondary cell.

(4) When the network device 200 determines that the signal quality of the secondary cell reported by the terminal 100 is greater than a specific threshold, the network device 200 may configure an added a secondary carrier for the terminal 100 by using RRC connection reconfiguration signaling that carries a specific field (for example, an sCellToAddMoList field).

In a possible implementation, the terminal 100 may configure the reported secondary cell event based on the measurement. The terminal 100 may measure a signal quality of the secondary cell, and determine whether the signal quality of the secondary cell is greater than a specific threshold. If yes, the terminal 100 may report a specified event (for example, an "A2" event) to the network device 200 in a measurement report. After the network device 200 identifies the specified event from the measurement report, the network device 200 may configure the added the secondary carrier for the terminal 100 by using the RRC connection reconfiguration signaling that carries the specific field (for example, the sCellToAddMoList field). If the terminal 100 determines that the signal quality of the secondary cell is not greater than the specific threshold, the terminal 100 does not report the specified event to the network device 200 in the measurement report. When the network device 200 does not identify the specified event from the measurement report, the network device 200 releases the secondary carrier added for the terminal 100.

(5) After receiving the RRC connection reconfiguration signaling used to configure the secondary carrier, the terminal 100 may complete adding of the secondary carrier, and return RRC connection reconfiguration signaling to the network device 200.

(6) After completing the adding of the secondary carrier, the terminal 100 may continue to periodically measure the signal quality of the secondary cell, and report the measurement value of the secondary cell to the network device 200.

3. The radio frequency channel allocation module 703 may allocate, according to some allocation policies, a radio frequency channel resource to the modem module applying for a resource, and return a success or failure instruction to the modem module. After successfully allocating the radio frequency channel to the modem module, the radio frequency channel allocation module 703 may further return, to the modem module, an identifier of a radio frequency channel (for example, a port number of the radio frequency channel) allocated to the modem module.

The radio frequency channel allocation module 703 may allocate the radio frequency channel resource to the modem module according to the following policies.

Policy 1:

When the modem module applies for the radio frequency channel resource for the secondary carrier from the radio frequency channel allocating module 703, the radio frequency channel allocation module 703 may determine whether a SIM card corresponding to the modem module is set to support a data service. If yes, the radio frequency channel allocation module 703 may return a success instruction to the modem module. When the radio frequency channel allocation module 703 determines that the SIM card corresponding to the modem module is set to support only a voice service, the radio frequency channel allocation module 703 may return a failure instruction to the modem module.

In this case, when a user sets the data service to be switched between different SIM cards, the terminal 100 does not need to re-initiate a deregistration procedure and a re-registration procedure, and the data service switching between the different SIM cards is fast while the data service is not interrupted.

Policy 2:

When the modem module applies for the radio frequency channel resource for the secondary carrier from the radio frequency channel allocation module 703, the radio frequency channel allocation module 703 may determine whether an idle radio frequency channel resource includes the radio frequency channel resource applied for by the modem module for the secondary carrier. If yes, the radio frequency channel allocation module 703 may return a success instruction to the modem module. If the idle (that is, unoccupied) radio frequency channel resource does not include the radio frequency channel resource applied by the modem module for the secondary carrier, the radio frequency channel allocation module 703 may return a failure instruction to the modem module.

In this way, when the modem module applies for the radio frequency channel resource, the radio frequency channel allocation module 703 may return a success instruction until idle radio frequency channel resources are exhausted. Then the radio frequency channel allocation module 703 returns a failure instruction. A radio frequency channel is first configured for a modem module that applies for a radio frequency channel resource earlier. In this way, radio frequency channel resources can be dynamically shared among SIM cards and allocated based on a requirement. Usually, when a network side configures a secondary carrier for a modem, it indicates that a large amount of data needs to be transmitted on the modem. This improves radio frequency channel resource usage.

Policy 3;

When the modem module applies for the radio frequency channel resource for the secondary carrier from the radio frequency channel allocation module 703, the radio frequency channel allocation module 703 may determine whether an idle radio frequency channel resource includes the radio frequency channel resource applied for by the modem module for the secondary carrier. If yes, the radio frequency channel allocation module 703 may return a success instruction to the modem module. If the idle radio frequency channel resource does not include the radio frequency channel resource applied for by the modem module for the secondary carrier, the radio frequency channel allocation module 703 may, according to a priority sequence of modem modules, determine whether a priority of a modem module that is applying for a radio frequency channel resource is higher than a priority of a modem module that has obtained a radio frequency channel resource. If yes, the radio frequency channel allocation module 703 may release a radio frequency channel resource that is applied for by a modem module with a lower priority for a secondary carrier; and allocates a released radio frequency channel resource to a modem module with a higher priority.

For example, the terminal 100 has a SIM card 1, a SIM card 2, and a SIM card 3. The SIM card 1 is configured with a modem module 1. The SIM card 2 is configured with a modem module 2. The SIM card 3 is configured with a modem module 3. The modem module 1 applies for two transmit radio frequency channels and two receive radio frequency channels for a secondary carrier. The modem module 2 applies for two transmit radio frequency channels and two receive radio frequency channels for a secondary carrier. There are no idle radio frequency channel resources in a radio frequency channel resource pool. In this case, when the modem module 3 receives RRC signaling that is used to add a secondary carrier and that is sent by the network side, in response to the RRC signaling, the modem module 3 may apply for a radio frequency channel resource for a secondary carrier from the radio frequency channel allocation module 703.

It is assumed that the modem module 3 needs to apply for two transmit radio frequency channels and two receive radio frequency channels for the secondary carrier, and a priority sequence of the modem modules is as follows; a priority of the modem module 3 is higher than a priority of the modem module 2, and the priority of the modem module 2 is higher than a priority of the modem module 1. In this case, the radio frequency channel allocation module 703 may indicate the modem module 1 to release the two transmit radio frequency channels and the two receive radio frequency channels occupied by the secondary carrier of the modem module 1, and allocate the released two transmit radio frequency channels and the two receive radio frequency channels to the modem module 3.

It is assumed that the modem module 3 needs to apply for two transmit radio frequency channels and two receive radio frequency channels for the secondary carrier, and the priority sequence of the modem modules is as follows: the priority of the modem module 3 is higher than the priority of the modem module 1, and the priority of the modem module 1 is higher than the priority of the modem module 2. In this case, the radio frequency channel allocation module 703 may indicate the modem module 2 to release the two transmit radio frequency channels and the two receive radio frequency channels occupied by the secondary carrier of the modem module 2, and allocate the released two transmit radio frequency channels and the two receive radio frequency channels to the modem module 3.

It is assumed that the modem module 3 needs to apply for two transmit radio frequency channels and two receive radio frequency channels for the secondary carrier, and the priority of the modem module 3 is lower than the priorities of the modem module 1 and the modem module 2. In this case, the radio frequency channel allocation module 703 may return a failure instruction to the modem module 3, to notify the modem module 3 that radio frequency channel resource allocation fails.

It is assumed that the modem module 3 needs to apply for four transmit radio frequency channels and four receive radio frequency channels for the secondary carrier, and the priority of the modem module 3 is higher than the priorities of the modem module 1 and the modem module 2. In this case, the radio frequency channel allocation module 703 may indicate the modem module 1 to release the two transmit radio frequency channels and the two receive radio frequency channels occupied by the secondary carrier of the modem module 1, and indicate the modem module 2 to release the two transmit radio frequency channels and the two receive radio frequency channels occupied by the secondary carrier of the modem module 2. The radio frequency channel allocation module 703 may allocate all the released four transmit radio frequency channels and four receive radio frequency channels to the modem module 3.

The radio frequency channel allocation module 703 may determine a priority of each modem module in any one of the following manners.

Manner (1):

The radio frequency channel allocation module 703 may determine a priority of a modem module based on reference signal received power (reference signal receiving power, RSRP)/a signal to interference plus noise ratio (signal to interference plus noise ratio, SINR) of each modem module in a primary cell. Higher RSRP/a higher SINR of a primary cell indicates a higher priority of a modem module.

Manner (2):

The radio frequency channel allocation module 703 may determine a priority sequence of modem modules based on uplink rates or downlink rates of the modem modules in primary cells. A priority of the modem module includes an uplink priority of the modem module and a downlink priority of the modem module. The radio frequency channel allocation module 703 may determine an uplink priority sequence of the modem modules based on the uplink rates of the modem modules in the primary cells, and allocate a transmit radio frequency channel resource to each modem module according to the uplink priority sequence of the modem modules. The radio frequency channel allocation module 703 may determine a downlink priority sequence of the modem modules based on the downlink rates of the modem modules in the primary cells, and allocate a receive radio frequency channel resource to each modem module according to the downlink priority sequence of the modem modules. A higher downlink rate of the primary cell indicates a higher downlink priority of the modem module. A higher uplink rate of the primary cell indicates a higher uplink priority of the modem module.

Manner (3):

The radio frequency channel allocation module 703 may allocate a radio frequency channel resource to each modem module based on a priority sequence of modems preset by a user. In a possible implementation, the user may manually set a priority of a SIM card, and the priority of the SIM card represents a priority of a modem module corresponding to the SIM card. For example, the user sets that a SIM card 1 supports a data service, and a SIM card 2 supports only a voice service. Therefore, a priority of a modem module corresponding to the SIM card 1 is higher than a priority of a modem module corresponding to the SIM card 2.

In this way, when the modem module applies for a radio frequency channel resource, the radio frequency channel allocation module 703 may allocate the radio frequency channel resource based on a priority of the modem module. When radio frequency channel resources are insufficient, optimal overall communication performance of the terminal 100 can be ensured.

4. If the radio frequency channel allocation module 703 successfully allocates a required radio frequency channel resource to the modem module, the modem module may configure the radio frequency channel based on the identifier of the radio frequency channel returned by the radio frequency channel allocation module 703, and add the secondary carrier. If the radio frequency channel allocation module 703 fails to allocate the radio frequency channel to the modem module, the modem module does not add the secondary carrier, and reports the measurement value of the secondary carrier cell as a preset value (for example, −141 dBm), to trigger the network side to release the secondary carrier.

According to a radio frequency channel sharing system provided in this embodiment of this application, the terminal 100 may report a same radio frequency capability when a modem module corresponding to each SIM card registers with a network side and reports UE capability information, and the terminal 100 may dynamically allocate a radio frequency resource to each modem module. When the radio frequency channel resource required for secondary carrier configuration is not allocated to the modem module, the modem module may return a configuration failure indication message to a network side device, and notify the network side to release the secondary carrier. When the radio frequency channel resource required for secondary carrier configuration is allocated to the modem module, the modem module may report an actual signal measurement value of the secondary cell to the network side, so as to trigger the network side to complete adding of the secondary cell for the modem module. In this way, when the data service is switched between the different SIM cards, the terminal does not need to initiate a deregistration procedure and a registration procedure, thereby reducing a switching time.

The following describes a radio frequency channel sharing method according to an embodiment of this application.

Figure 8A:
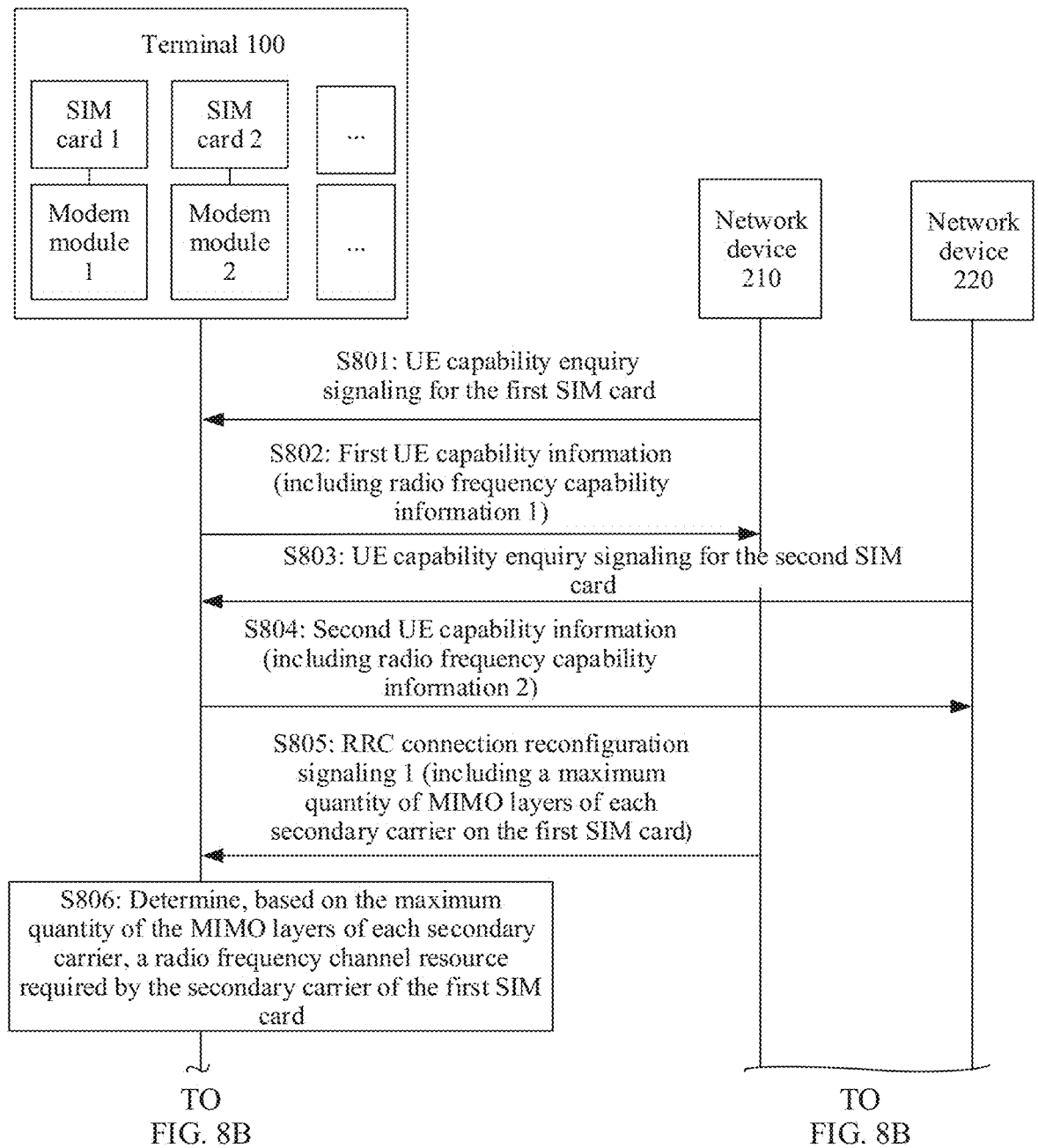
FIG. 8A and FIG. 8B are a schematic flowchart of a radio frequency channel sharing method according to an embodiment of this application.
Figure 8B:
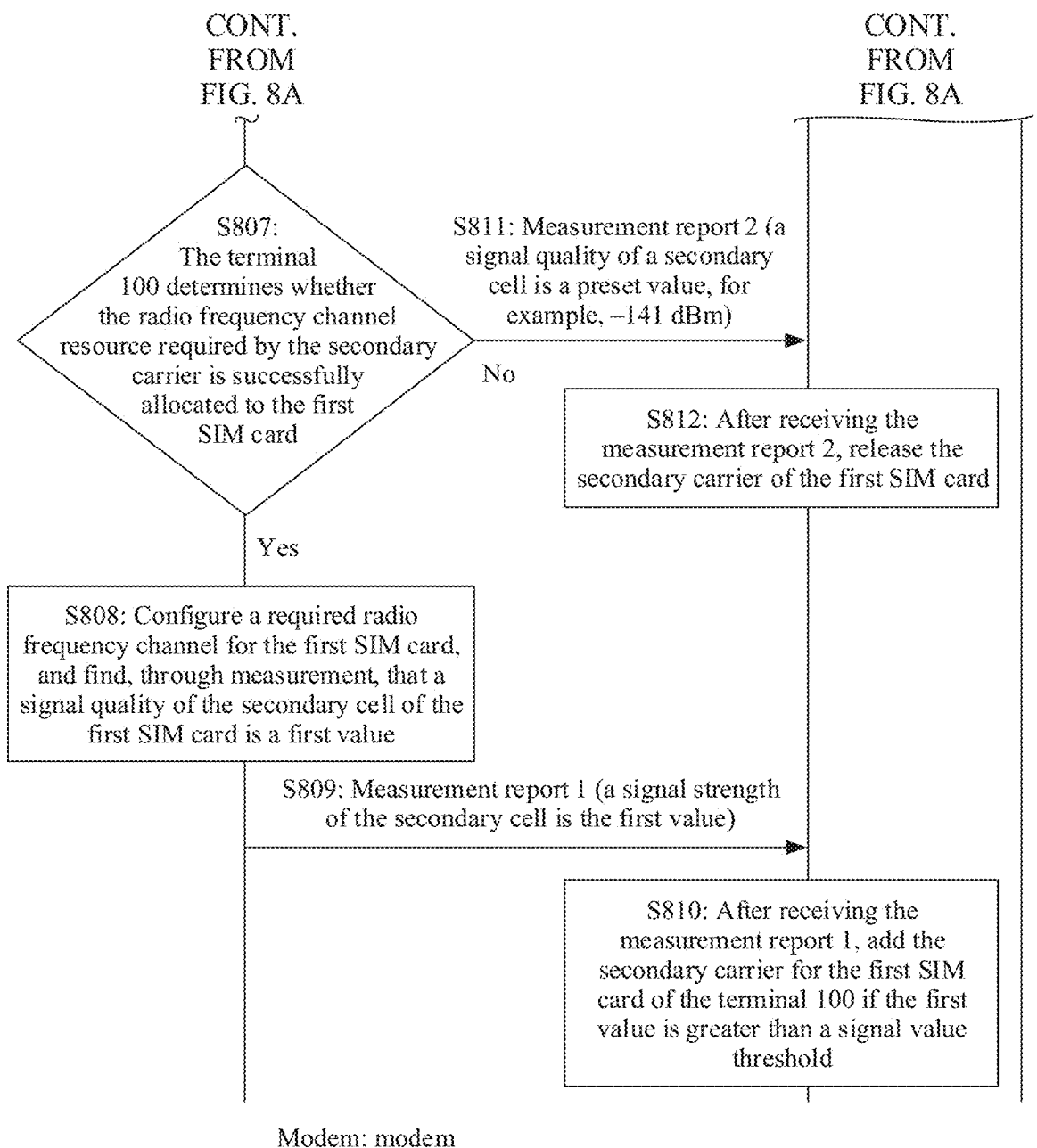

FIG. 8A and FIG. 8B are a schematic flowchart of a radio frequency channel sharing method according to an embodiment of this application. Based on the embodiments shown in FIG. 7A and FIG. 7B, as shown in FIG. 8A and FIG. 8B, a terminal 100 includes at least two SIM cards (including a first SIM card and a second SIM card) and at least two modem modules (including a first modem module and a second modem module). Each SIM card corresponds to one modem module. In FIG. 8A and FIG. 8B, an example in which the terminal 100 includes two SIM cards is used for description. For example, the terminal 100 allocates the first modem module to the first SIM card, and allocates the second modem module to the second SIM card. The first modem module may communicate with a network device 210, and the second modem module may communicate with a network device 220. For hardware structures of the network device 210 and the network device 220, refer to the text descriptions for the network device 200 in the embodiment shown in FIG. 4. Details are not described herein again. The network device 210 and the network device 220 may be collectively referred to as a network side device.

As shown in FIG. 8A and FIG. 8B, the method includes the following steps.

S801: The network device 210 sends UE capability enquiry (UE Capability Enquiry) signaling for the first SIM card to the terminal 100, where the UE capability enquiry signaling is used to inquire a capability of the terminal 100.

When the terminal 100 registers with the network device 210, the network device 210 may send the UE capability enquiry signaling for the first SIM card to the terminal 100. Specifically, when the terminal 100 is powered on or restarted, or when an airplane mode is disabled, or the like, after finding a network to be accessed by the SIM card 1, the terminal 100 may send RRC connection request signaling for the first SIM card to the network device 210. After receiving the RRC connection request signaling for the first SIM card, the network device 210 may return RRC connection establishment signaling for the first SIM card to the terminal 100. After receiving the RRC connection establishment signaling for the first SIM card, the terminal 100 may send RRC connection establishment complete signaling (carrying registration request signaling) for the first SIM card to the network device 210, to trigger a registration procedure for the first SIM card. After receiving the RRC connection establishment complete signaling for the first SIM card, the network device 210 may send the UE capability enquiry signaling for the first SIM card to the terminal 100. For a specific registration procedure, refer to the embodiment shown in FIG. 2A. Details are not described herein again.

S802: The terminal 100 sends first UE capability information (UE Capability Information) to the network device 210, where the first UE capability information includes radio frequency capability information 1.

The first UE capability information includes the radio frequency capability information 1 and other capability information. The radio frequency capability information 1 is carried in a Band Combination List (Band Combination List) field in the first UE capability information. The Band Combination List field includes a band combination supported by the terminal 100, a quantity of carriers supported by each band in each band combination, and a MIMO capability (also referred to as a quantity of MIMO layers) of each carrier.

For example, a signaling format of the Band Combination List field may be as follows.

"BandCombinationList:: =SEQUENCE{SIZE{1..maxBandComb}}OF BandCombination,
BandCombination::=SEQUENCE{
   bandList  SEQUENCE{SIZE{1..maxSimultaneousBands}}OF BandParameters,
   FeatureSetCombination  FeatureSetCombinationId,
   ...
}"

The Band Combination List field may include a plurality of BandParameters (BandParameters) fields. The BandParameters field may indicate a band supporting CA on the terminal 100, and a plurality of BandParameters fields indicate a band combination supporting CA on the terminal 100.

For example, the BandParameters field may include the following information elements:

```
BandParameters ::=              CHOICE {
    eutra                       SEQUENCE {
        bandEUTRA                   FreqBandIndicatorEUTRA,
        ca-BandwidthClassDL-EUTRA        CA-BandwidthClassEUTRA
    OPTIONAL,
        ca-BandwidthClassUL-EUTRA        CA-BandwidthClassEUTRA
    OPTIONAL
    },
    nr                          SEQUENCE {
        bandNR                      FreqBandIndicatorNR,
        ca-BandwidthClassDL-NR           CA-BandwidthClassNR
    OPTIONAL,
        ca-BandwidthClassUL-NR           CA-BandwidthClassNR
    OPTIONAL
    }
}
```

The bandList (bandList) information element in the Band Combination List field may be used to indicate a band included in each band combination, and each band may be indicated by the following information element: Each band may be an LTE or NR band. The bandEUTRA information element indicates an LTE band. For example, when a value of the bandEUTRA information element is "1", the bandEUTRA information element indicates an LTE B1 band. When the value of the bandEUTRA information element is 2, the bandEUTRA information element indicates an LTE B2 band. The bandNR information element may be used to indicate an NR band. For example, when a value of the bandNR information element is "1", the bandNR information element indicates an NR n1 band. When the value of the bandNR information element is 2, the bandNR information element indicates an NR n2 band.

The ca-BandwidthClassDL-EUTRA information element may be used to indicate a downlink aggregation type of the LTE band, and the ca-BandwidthClassDL-NR information element may be used to indicate a downlink aggregation type of the NR band. For example, when a value of the ca-BandwidthClassDL-EUTRA information element or the ca-BandwidthClassDL-NR information element is "A" or "a", the information element indicates a single carrier. When the value of the ca-BandwidthClassDL-EUTRA or the ca-BandwidthClassDL-NR information element is B or b, the information element indicates aggregation of two contiguous carriers in a band.

The FeatureSetCombination information element in the Band Combination List field indicates a feature set (Feature Set) combination (FeatureSetCombination), which includes information elements that indicate an uplink feature set and a down link feature set of each band in the band combination, namely, downlinkSetEUTRA/downlinkSetNR and uplinkSetEUTRA/uplinkSetNR.

For example, the FeatureSetCombination information element may be shown as follows.

```
FeatureSetCombination ::=        SEQUENCE (SIZE (1..maxSimultaneousBands))
OF FeatureSetsPerBand
    FeatureSetsPerBand ::=       SEQUENCE (SIZE (1..maxFeatureSetsPerBand))
OF FeatureSet
    FeatureSet ::=               CHOICE {
      eutra                        SEQUENCE {
        downlinkSetEUTRA             FeatureSetEUTRA-DownlinkId,
        uplinkSetEUTRA               FeatureSetEUTRA-UplinkId
      },
      nr                           SEQUENCE {
        downlinkSetNR                FeatureSetDownlinkId,
        uplinkSetNR                  FeatureSetUplinkId
      }
    }
```

Further, the FeatureSet information elements for downlink and uplink of each band indicate a MIMO capability (that is, a quantity of MIMO layers) of each carrier on the band. A featureSetListPerDownlinkCC information element and a featureSetListPerUplinkCC information element respectively indicate a feature set of each downlink carrier and a feature set of each uplink carrier.

For example, a downlink feature set (FeatureSetDownLink) information element and an uplink feature set (FeatureSetUpLink) information element of each band may be as follows.

```
FeatureSetDownlink ::=           SEQUENCE {
    featureSetListPerDownlinkCC       SEQUENCE (SIZE
(1..maxNrofServingCells)) OF FeatureSetDownlinkPerCC-Id,
}
FeatureSetUplink :=              SEQUENCE {
    featureSetListPerUplinkCC         SEQUENCE (SIZE (1..
maxNrofServingCells)) OF FeatureSetUplinkPerCC-Id,
}
```

For example, the featureSetListPerDownlinkCC information element and the featureSetListPerUplinkCC information element may be as follows.

```
FeatureSetUplinkPerCC ::=                    SEQUENCE {
  ...
  mimo-CB-PUSCH                                SEQUENCE {
    maxNumberMIMO-LayersCB-PUSCH                  MIMO-LayersUL
OPTIONAL,
    ...
  }
OPTIONAL,
    maxNumberMIMO-LayersNonCB-PUSCH            MIMO-LayersUL
OPTIONAL,
  ...
}
FeatureSetDownlinkPerCC ::=                  SEQUENCE {
  ...
  maxNumberMIMO-LayersPDSCH                    MIMO-LayersDL
OPTIONAL,
}
```

The feature set of each carrier indicates a MIMO capability of each carrier. For uplink, the maxNumberMIMO-LayersCB-PUSCH information element and the maxNumberMIMO-LayersNonCB-PUSCH information element indicate a MIMO capability for codebook (codebook)-based or non-codebook (non-codebook)-based MIMO. For downlink, the maxNumberMIMO-LayersPDSCH information element indicates the MIMO capability.

For example, the radio frequency capability reported by the terminal 100 is a four-layer MIMO capability of a band B1+a four-layer MIMO capability of a band B3+a four-layer MIMO capability of a band B7 for downlink. In this case, the bandList (bandList) information element in the Band Combination List field in the UE capability information reported by the terminal 100 may include three bandEUTRA information elements (a bandEUTRA information element 1, a bandEUTRA information element 2, and a bandEUTRA information element 3) and FeatureSet information elements (a FeatureSet information element 1, a FeatureSet information element 2, and a FeatureSet information element 3) corresponding to the three bandEUTRA information elements. A value of the bandEUTRA information element 1 may be "1", a value of the bandEUTRA information element 2 may be "3", and a value of the bandEUTRA information element 3 may be "7". The bandEUTRA information element 1 corresponds to the FeatureSet information element 1. A value of a maxNumberMIMO-LayersPDSCH information element in the FeatureSet information element 1 is 4. The bandEUTRA information element 2 corresponds to the FeatureSet information element 2. A value of a maxNumberMIMO-LayersPDSCH information element in the FeatureSet information element 2 is 4. The bandEUTRA information element 3 corresponds to the FeatureSet information element 3. A value of a maxNumberMIMO-LayersPDSCH information element in the FeatureSet information element 3 is 4. The foregoing example is merely used to explain this application and shall not be construed as a limitation.

The terminal 100 may generate, based on the radio frequency capability of the terminal 100, a band combination capability supported by the terminal 100, where the band combination capability includes a CA capability and a quantity of MIMO layers. After a radio frequency channel design of the terminal 100 is determined, the band combination capability supported by the terminal 100 is also determined. Alternatively, the radio frequency channel of the terminal 100 may be designed based on a band combination capability supporting CA of the terminal 100. The terminal 100 may write the band combination capability supported by the terminal 100 into a configuration file. When the terminal 100 reports the UE capability information, the terminal 100 may read the band combination capability from the configuration file, assemble the UE capability information signaling with the band combination capability, and report the UE capability information signaling to the network side.

For example, after the network device 210 delivers the UE capability enquiry signaling for the first SIM card, the terminal 100 may send, to the network device 210 by using the modem module corresponding to the first SIM card, UE capability information signaling that carries a band combination capability. After the network device 220 delivers UE capability enquiry signaling for the second SIM card, the terminal 100 may send, to the network device 220 by using the modem module corresponding to the second SIM card, UE capability information signaling that carries a band combination capability.

S803: The network device 220 sends the UE capability enquiry signaling for the second SIM card to the terminal 100.

S804: The terminal 100 sends second UE capability information to the network device 220, where the second UE capability information includes radio frequency capability information 2, and the radio frequency capability information 2 is the same as the radio frequency capability information 1.

For a process in which the terminal 100 sends the second UE capability information to the network device 220, refer to the process in which the terminal 100 sends the first UE capability information to the network device 210 in step S802. Details are not described herein again.

When the network side delivers UE capability enquiry signaling for another SIM card to the terminal 100, radio frequency capability information in the UE capability information returned by the terminal 100 to the network side is the same as the radio frequency capability information 1 and the radio frequency capability information 2.

For example, the radio frequency channels (which may be used to transmit and receive signals) of the terminal 100 includes: the four radio frequency channels on the band B1, the four radio frequency channels on the band B3, and the four radio frequency channels on the band B7. The terminal 100 is configured with the first SIM card and the second SIM card. The first SIM card is a data service SIM card and supports the data service and the voice call. The second SIM card supports only the voice call (including VoLTE or VoNR), and does not support the data service. Both the first SIM card and the second SIM card support and report the following band combinations in the UE capability information:

1. a band combination of a two-layer MIMO capability of the band B1+a four-layer MIMO capability of the band B3+a four-layer MIMO capability of the band B7;
2. a band combination of a four-layer MIMO capability of the band B1+a two-layer MIMO capability of the band B3+the four-layer MIMO capability of the band B7; and
3. a band combination of the four-layer MIMO capability of the band B1+the four-layer MIMO capability of the band B3+a two-layer MIMO capability of the band B7.

In addition, fallback band combinations (fallback band combinations) of the foregoing three band combinations are supported and reported.

In this embodiment of this application, each SIM card reports a maximum radio frequency capability of the terminal 100 when reporting the UE capability information to the network side. In other words, the radio frequency capability information in the UE capability information reported by each SIM card is: the four-layer MIMO capability of the B1 band+the four-layer MIMO capability of the B3 band+the four-layer MIMO capability of the B7 band.

The foregoing example is merely used to explain this application and shall not be construed as a limitation.

In this embodiment of this application, when the first SIM card is the data service SIM card supporting the data service and the voice communication service, the first SIM card may support a first radio frequency capability, and the second SIM card may support a second radio frequency capability, where the first radio frequency capability is stronger than the second radio frequency capability. Both the radio frequency capability information of the first SIM card and the radio frequency capability information of the second SIM card that are reported by the terminal 100 are the first radio frequency capability. In some embodiments, the first radio frequency capability may include a capability of enabling the network side device to add the secondary carrier for the terminal, and the second radio frequency capability does not include the capability of enabling the network side device to add the secondary carrier for the terminal.

The first radio frequency capability being stronger than the second radio frequency capability may mean that a quantity of bands supporting CA and/or a quantity of MIMO layers in the first radio frequency capability are/is greater than a quantity of bands supporting CA and/or a quantity of MIMO layers in the second radio frequency capability. For example, the first radio frequency capability may be the four-layer MIMO capability of the band B1+the four-layer MIMO capability of the band B3+the four-layer MIMO capability of the band B7, and the second radio frequency capability may be the two-layer MIMO capability of the band B1+the two-layer MIMO capability of the band B3+the two-layer MIMO capability of the band B7.

S805: The network device 210 sends RRC connection reconfiguration signaling 1 (which may be referred to as first RRC connection reconfiguration signaling) to the terminal 100, where the RRC connection reconfiguration signaling 1 includes a maximum quantity of MIMO layers of each secondary carrier on the first SIM card.

S806: The terminal 100 determines, based on the maximum quantity of MIMO layers of each secondary carrier in the RRC connection reconfiguration signaling 1, a radio frequency channel resource required by the secondary carrier of the first SIM card.

For example, the RRC connection reconfiguration signaling 1 may include a maximum quantity of MIMO layers of a secondary carrier of the band B3 and a maximum quantity of MIMO layers of a secondary carrier of the band B7 in a downlink of the first SIM card. In addition, the maximum quantity of the MIMO layers of the secondary carrier of the downlink band B3 is 4, and the maximum quantity of the MIMO layers of the secondary carrier of the downlink band B7 is 4. Therefore, the radio frequency channel resource required by the secondary carrier of the first SIM card is four receive radio frequency channels of the band B3 and four receive radio frequency channels of the band B7. The foregoing example is merely used to explain this application and shall not be construed as a limitation.

S807: The terminal 100 determines whether the radio frequency channel resource required by the secondary carrier is successfully allocated to the first SIM card.

If yes, step S808 is performed. S808: The terminal 100 configures, for the first SIM card, the radio frequency channel resource required by the secondary carrier, and finds, through measurement, that a signal strength of a secondary cell of the first SIM card is a first value.

For example, the idle radio frequency channel resource of the terminal 100 may include the four radio frequency channels on the band B1, the four radio frequency channels on the band B3, and the four radio frequency channels on the band B7. Each radio frequency channel may be used to send and receive signals. The radio frequency channel resource required by the secondary carrier of the first SIM card may include the four radio frequency channels of the band B3. The idle radio frequency channel resource of the terminal 100 includes the radio frequency channel resource required by the secondary carrier of the first SIM card. In this case, the terminal 100 may configure four radio frequency channels of the band B3 for the secondary carrier of the first SIM card. The foregoing example is merely used to explain this application and shall not be construed as a limitation.

For specific implementation of allocating, by the terminal 100, the radio frequency channel resource required by the secondary carrier to the first SIM card, refer to the embodiment shown in FIG. 7A. Details are not described herein again.

S809: The terminal 100 sends a measurement report 1 (which may be referred to as a first measurement report) to the network device 210, where the signal quality of the secondary cell in the measurement report 1 is the first value.

S810: After receiving the measurement report 1, the network device 210 adds the secondary carrier for the first SIM card of the terminal 100 if the first value is greater than a signal value threshold.

In a possible implementation, the terminal 100 may configure a reported secondary cell event based on measurement. The terminal 100 may measure the signal quality of the secondary cell on the first SIM card, and determine whether the signal quality of the secondary cell on the first SIM card is greater than the signal value threshold. If yes, the terminal 100 may report a specified event (for example, an "A2" event) to the network device 210 in the measurement report 1. After the network device 210 identifies the specified event (for example, the "A2" event) from the measurement report 1, the network device 210 may use RRC connection reconfiguration signaling carrying a specific field (for example, an sCellToAddMoList field) to add the secondary carrier for the first SIM card configured in the terminal 100.

A measurement parameter of the signal quality of the secondary cell of the first SIM card may include RSRP, and/or an SINR, and/or RSRQ of the secondary cell.

In this embodiment of this application, for a process in which the network device 210 adds the secondary carrier for the first SIM card of the terminal 100 after receiving the measurement report 1, refer to the embodiment shown in FIG. 7B. Details are not described herein again.

S811: When the terminal 100 determines that the idle radio frequency channel resource on the terminal 100 does not include the radio frequency channel resource required by the first SIM card, the terminal 100 sends a measurement report 2 (which may be referred to as a second measurement report) to the network device 210, where the signal strength of the secondary cell in the measurement report 2 is a preset value (for example, −141 dBm), and the preset value is less than the signal value threshold.

S812: After receiving the measurement report 2, the network device 210 releases the secondary carrier added for the first SIM card.

In a possible implementation, the terminal 100 may configure a reported secondary cell event based on measurement. When the terminal 100 determines that the idle radio frequency channel resource on the terminal 100 does not include the radio frequency channel resource required by the first SIM card, the terminal 100 may determine whether the preset value is greater than the signal value threshold. If no, the terminal 100 does not report the specified event (for example, the "A2" event) to the network device 210 in the measurement report 4. When the network device 210 does not identify the specified event from the measurement report 4, the network device 210 releases the secondary carrier added for the first SIM card of the terminal 100.

A measurement parameter of the signal quality of the secondary cell of the first SIM card may include RSRP, and/or an SINR, and/or RSRQ of the secondary cell.

For example, a preset value of the RSRP of the secondary cell of the first SIM card may be −156 dBm, a preset value of the RSRQ of the secondary cell may be −43, and a preset value of the SINR of the secondary cell may be −23.

According to the radio frequency channel sharing method provided in this embodiment of this application, when two SIM cards are inserted into the terminal 100, and the two SIM cards simultaneously access an LTE or an NR network, supported band combinations and MIMO capabilities of the band combinations are the same in UE capability information that corresponds to the two SIM cards and that is reported by the terminal 100 to the network side. When the network side simultaneously configures secondary carriers for the maximum radio frequency specifications of the two SIM cards and sends downlink data on the secondary carriers, some secondary carriers of the two SIM cards have uplink and downlink bit errors, and measurement values that are of secondary cells on the secondary carriers and that are reported by the terminal 100 to the network side are close to a minimum value (for example, −141 dBm). According to the foregoing method, when the data service is switched between the different SIM cards, the terminal does not need to initiate a deregistration procedure and a registration procedure, thereby reducing a switching time.

The following describes a radio frequency channel sharing method according to another embodiment of this application.

Figure 9A:
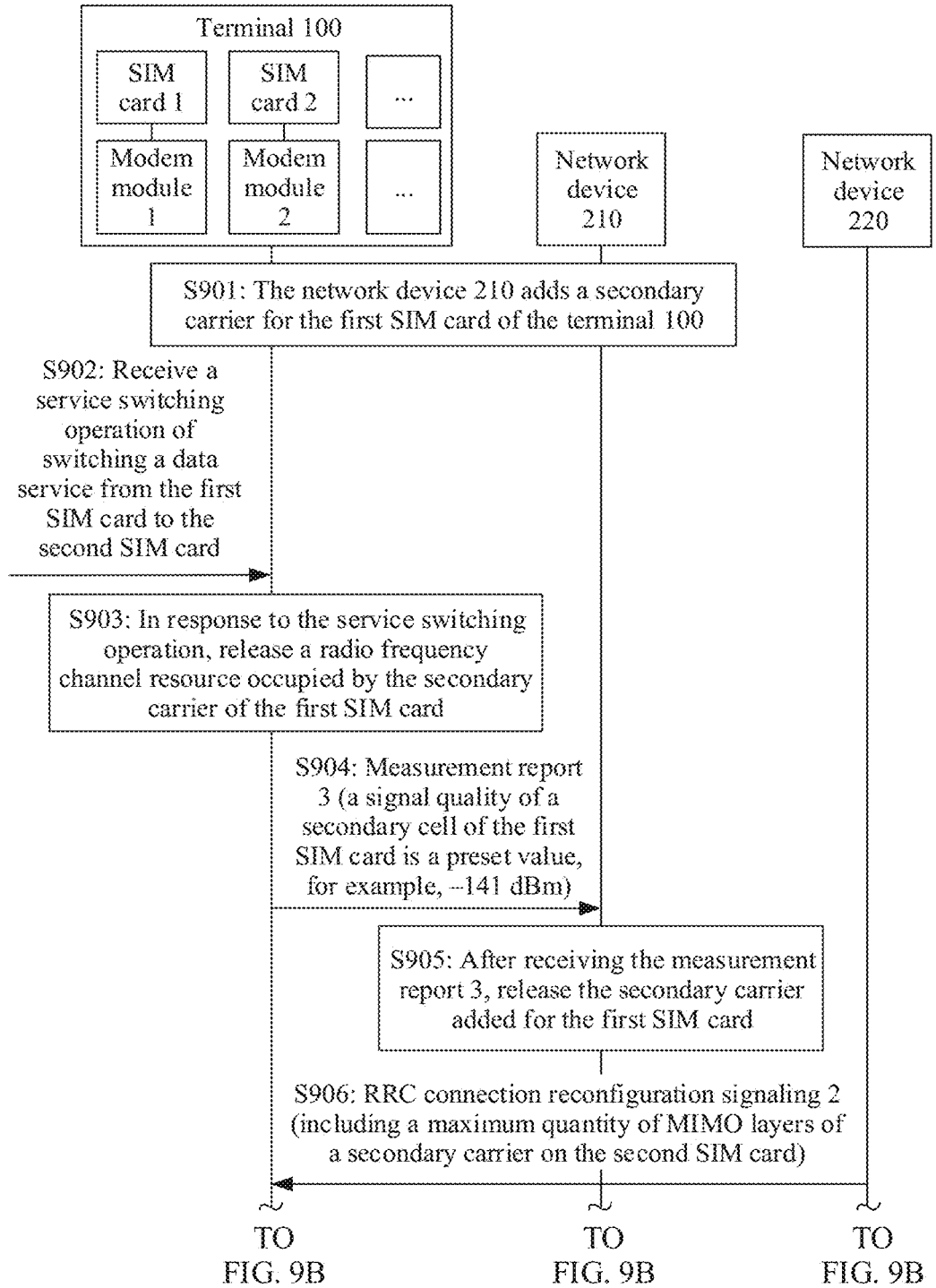
FIG. 9A and FIG. 9B are a schematic flowchart of a radio frequency channel sharing method according to another embodiment of this application.
Figure 9B:
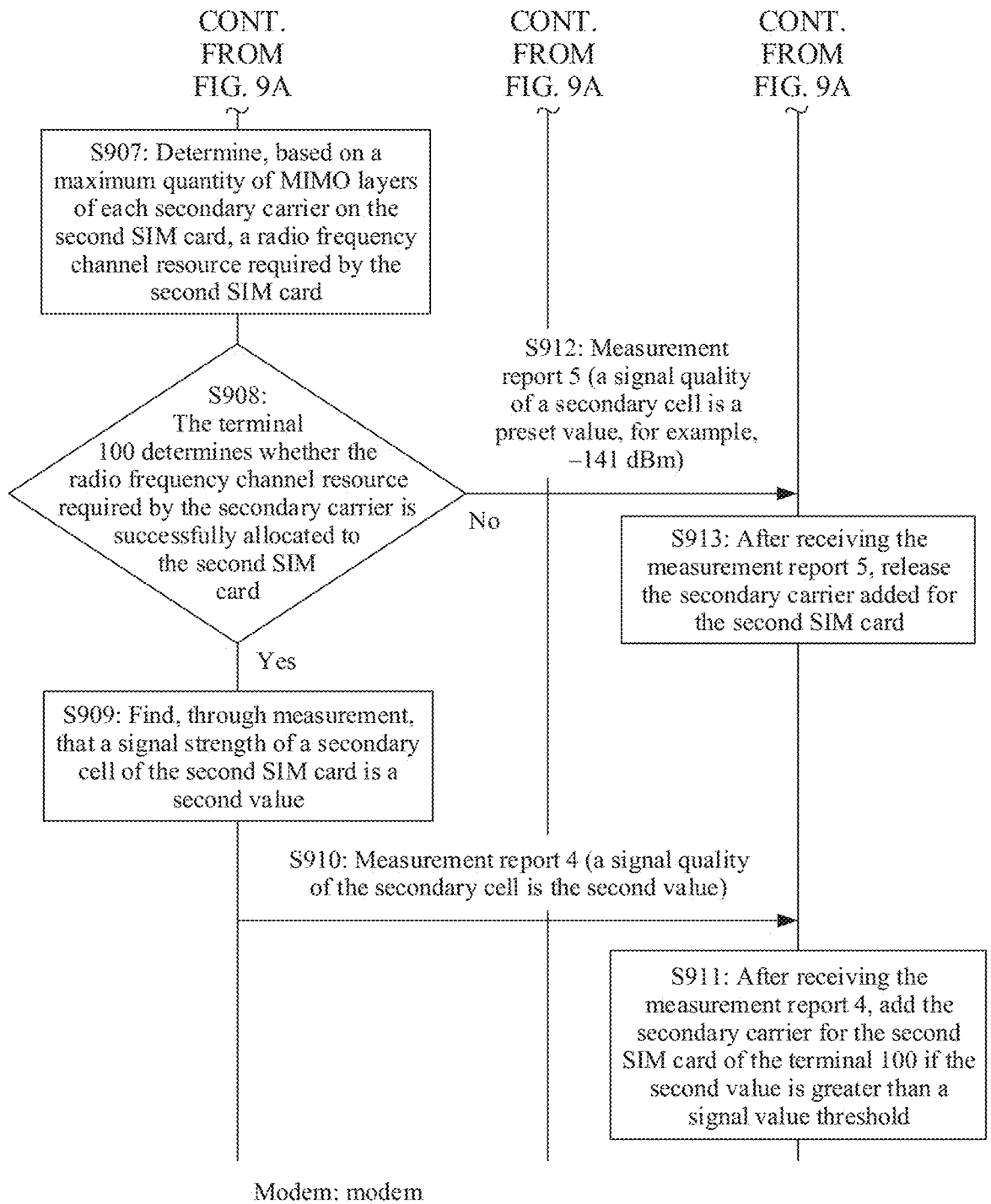

FIG. 9A and FIG. 9B are a schematic flowchart of a radio frequency channel sharing method according to an embodiment of this application. Based on the embodiments shown in FIG. 7A and FIG. 7B, as shown in FIG. 9A and FIG. 9B, a terminal 100 includes at least two SIM cards (including a first SIM card and a second SIM card) and at least two modem modules (including a first modem module and a second modem module). Each SIM card corresponds to one modem module. In FIG. 9A and FIG. 9B, an example in which the terminal 100 includes two SIM cards is used for description. For example, the terminal 100 allocates a first modem module to the first SIM card, and allocates a second modem module to the second SIM card. The first modem module may communicate with a network device 210, and the second modem module may communicate with a network device 220. For hardware structures of the network device 210 and the network device 220, refer to the text descriptions for the network device 200 shown in FIG. 4.

Details are not described herein again. The network device 210 and the network device 220 may be collectively referred to as a network side device.

As shown in FIG. 9A and FIG. 9B, the method includes the following steps.

S901. When a preset condition is met, a network device 210 adds a secondary carrier for the first SIM card of the terminal 100.

In this case, the first SIM card is set to a SIM card supporting a data service, and the network device 210 has added a secondary carrier for the first SIM card. The second SIM card is set to a SIM card supporting only a voice service, and the network device 220 temporarily does not add a secondary carrier for the second SIM card.

For a process in which the network device 210 adds the secondary carrier for the first SIM card, refer to the embodiment shown in FIG. 7B. Details are not described herein again.

S902: The terminal 100 receives a service switching operation of switching a data service from a first SIM card to a second SIM card.

Figure 10A:
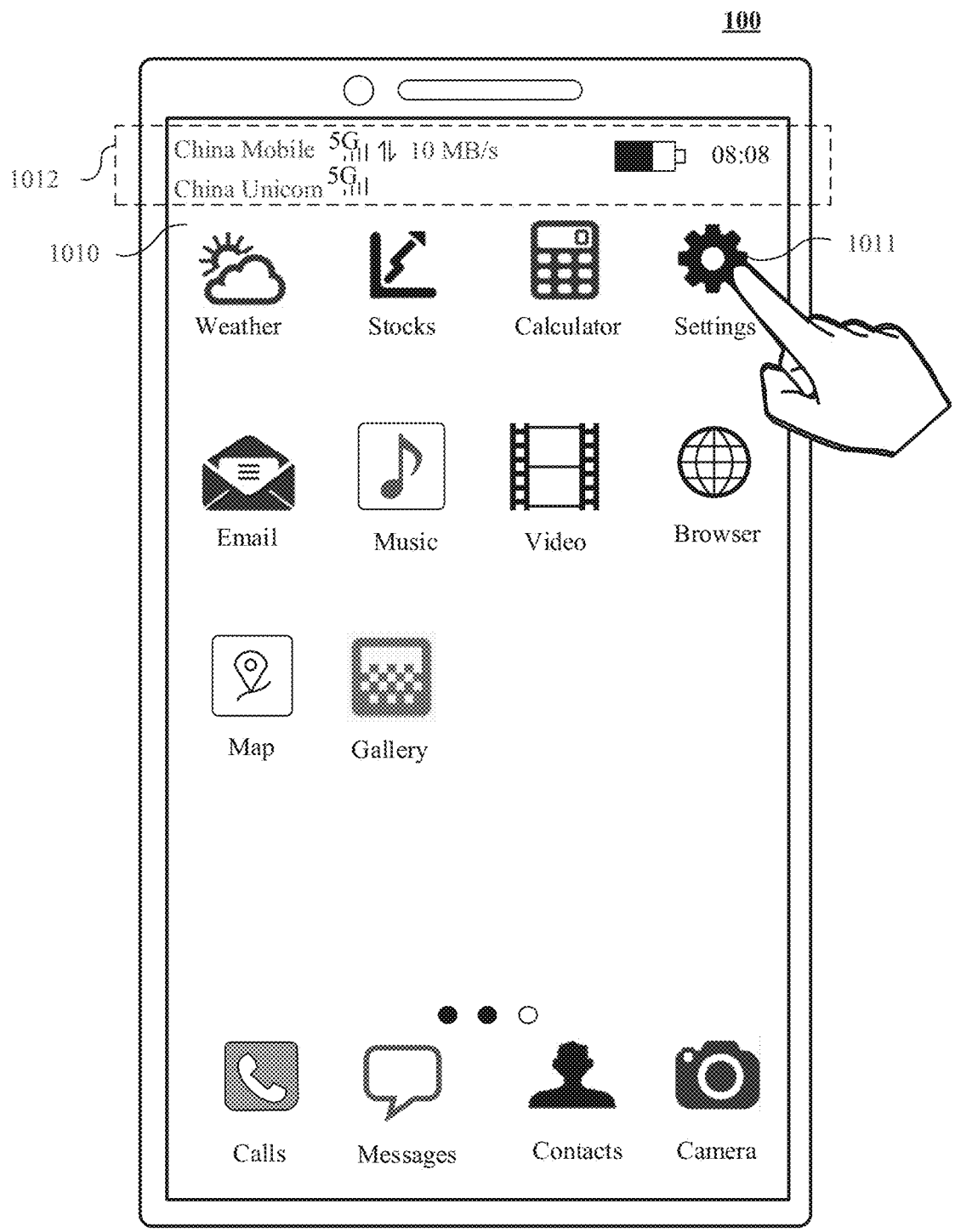
FIG. 10A to FIG. 10E are schematic diagrams of a group of interfaces according to an embodiment of this application.

For example, as shown in FIG. 10A, the terminal 100 displays an interface 1010 of a home screen (home screen), and a page on which application icons are placed is displayed in the interface 1010. The page includes a plurality of application icons (for example, a weather application icon, a stock application icon, a calculator application icon, a settings application icon 1011, an email application icon, a music application icon, a video application icon, a browser application icon, a map application icon, and a gallery application icon). Optionally, a page indicator is further displayed below the plurality of application icons, to indicate a quantity of pages on the home screen and a position relationship between a currently displayed page and another page. For example, the interface 1010 of the home screen may include three pages, and a white dot in the page indicator may indicate that the currently displayed page is a rightmost page of the three pages. There are a plurality of tray icons (for example, a dial application icon, a message application icon, a contact application icon, and a camera application icon) below the page indicator, and the tray icons remain displayed during page switching. A status bar 1012 may be further displayed in the interface 1010. The status bar 1012 may include time information, battery information, a name of a carrier whose network is accessed by each SIM card, a working standard of each SIM card, a data service download speed, and the like. For example, a name of a carrier providing a network accessed by the first SIM card is "China Mobile", a working standard of the first SIM card is a 5G network access standard, a name of a carrier providing a network accessed by the second SIM card is "China Unicom", and a working standard of the second SIM card is the 5G network access standard. Currently, the first SIM card is set to the SIM card supporting the data service, a data service download speed of the first SIM card is "10 MB/s", and the second SIM card is set to the SIM card supporting only the voice service. The status bar 1012 may be always displayed on the top of a screen of the terminal 100.

The terminal 100 may receive an operation (for example, click) performed by a user on the settings application icon 1011. In response to the operation, the terminal 100 may display a settings interface 1020 shown in FIG. 10B.

Figure 10B:
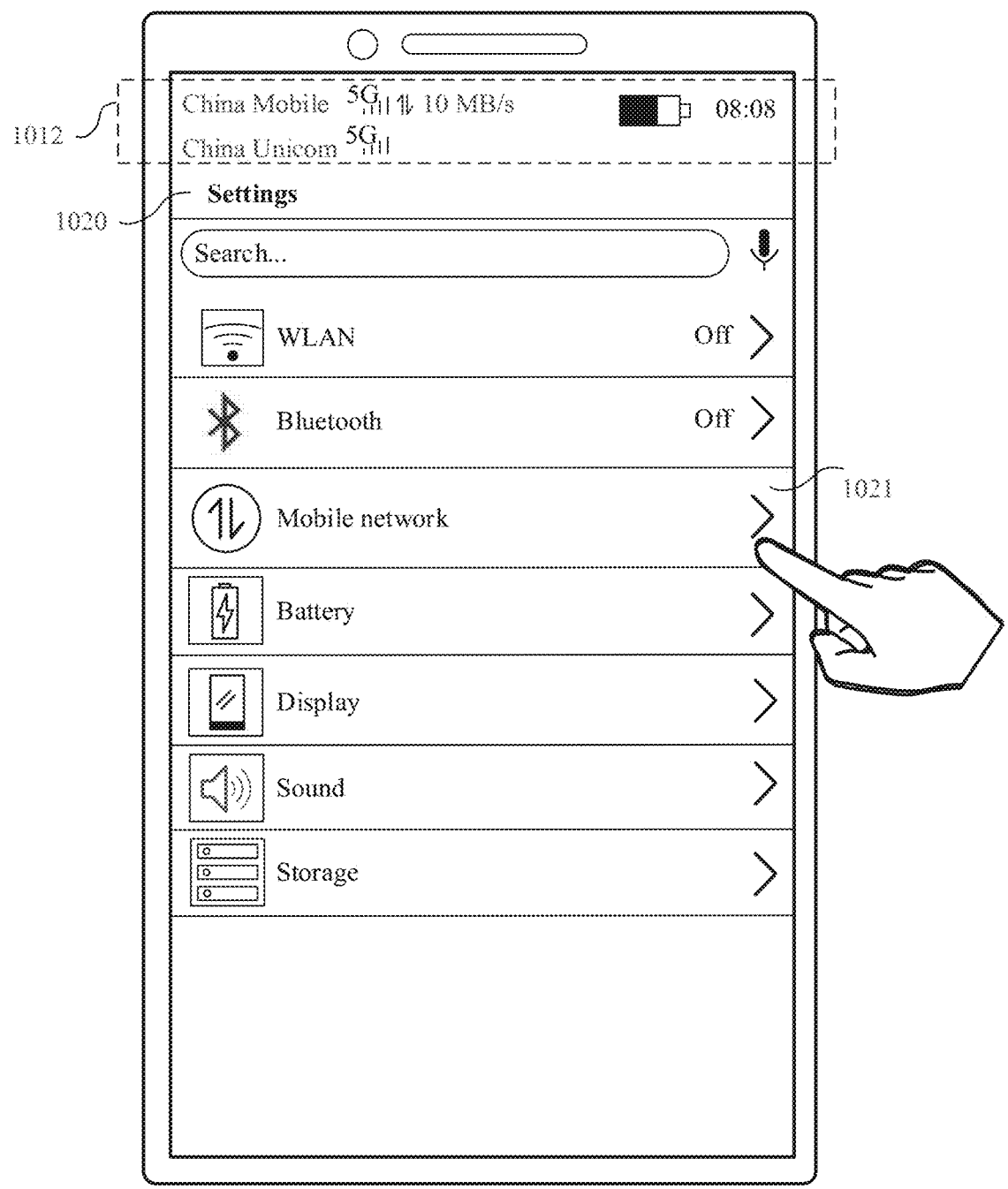

As shown in FIG. 10B, the settings interface 1020 includes a mobile network settings bar 1021 and another settings bar (for example, a WLAN settings bar, a Bluetooth settings bar, a battery settings bar, a display settings bar, a sound settings bar, a storage settings bar, and so on).

Figure 10C:
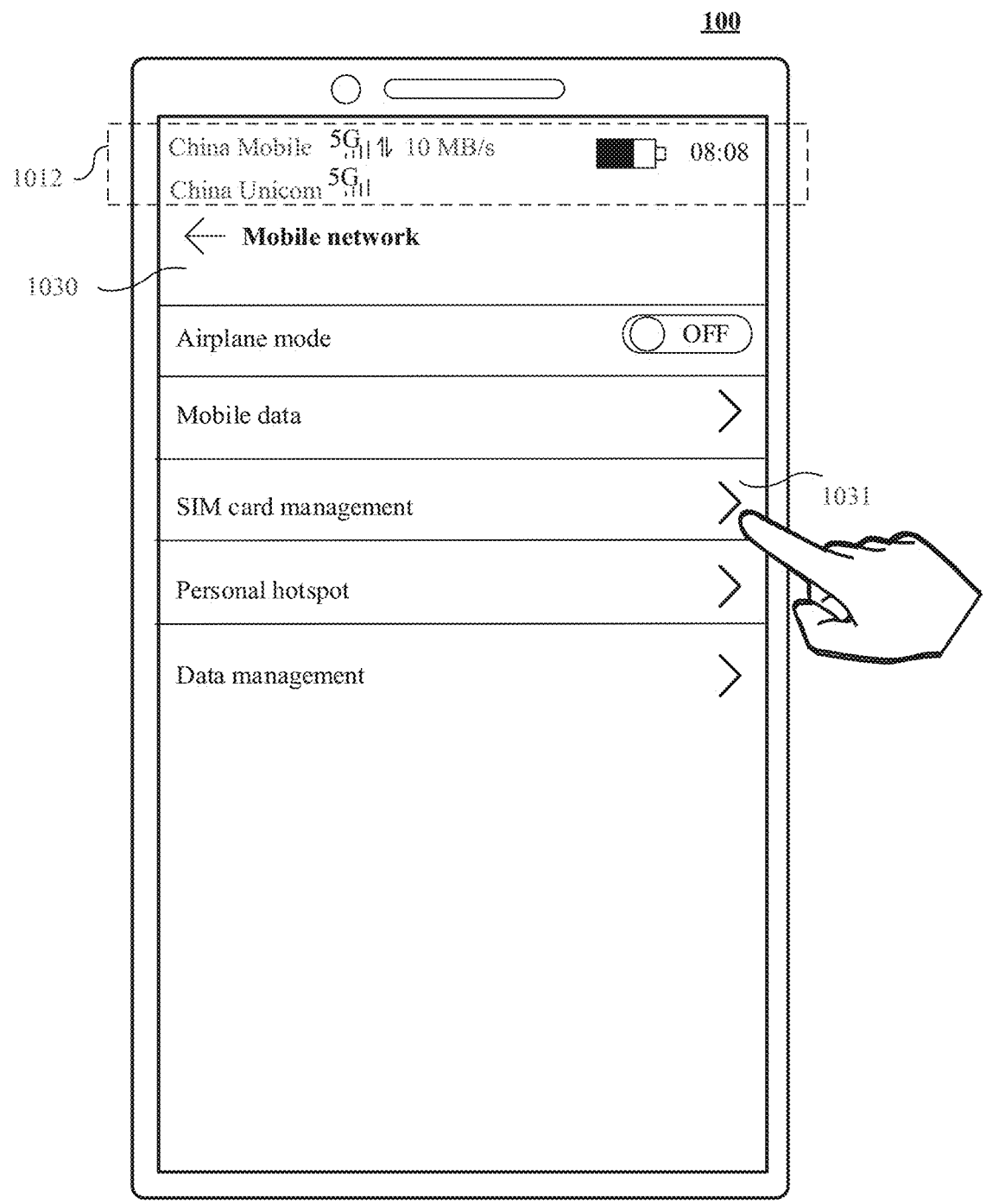

The terminal 100 may receive an operation on the mobile network settings bar 1021, and in response to the operation, the terminal 100 may display a mobile network settings interface 1030 shown in FIG. 10C.

As shown in FIG. 10C, the mobile network settings interface 1030 includes a SIM card management settings bar 1031 and another settings bar (for example, airplane mode settings bar, mobile data settings bar, personal hotspot settings bar, data management bar).

Figure 10D:
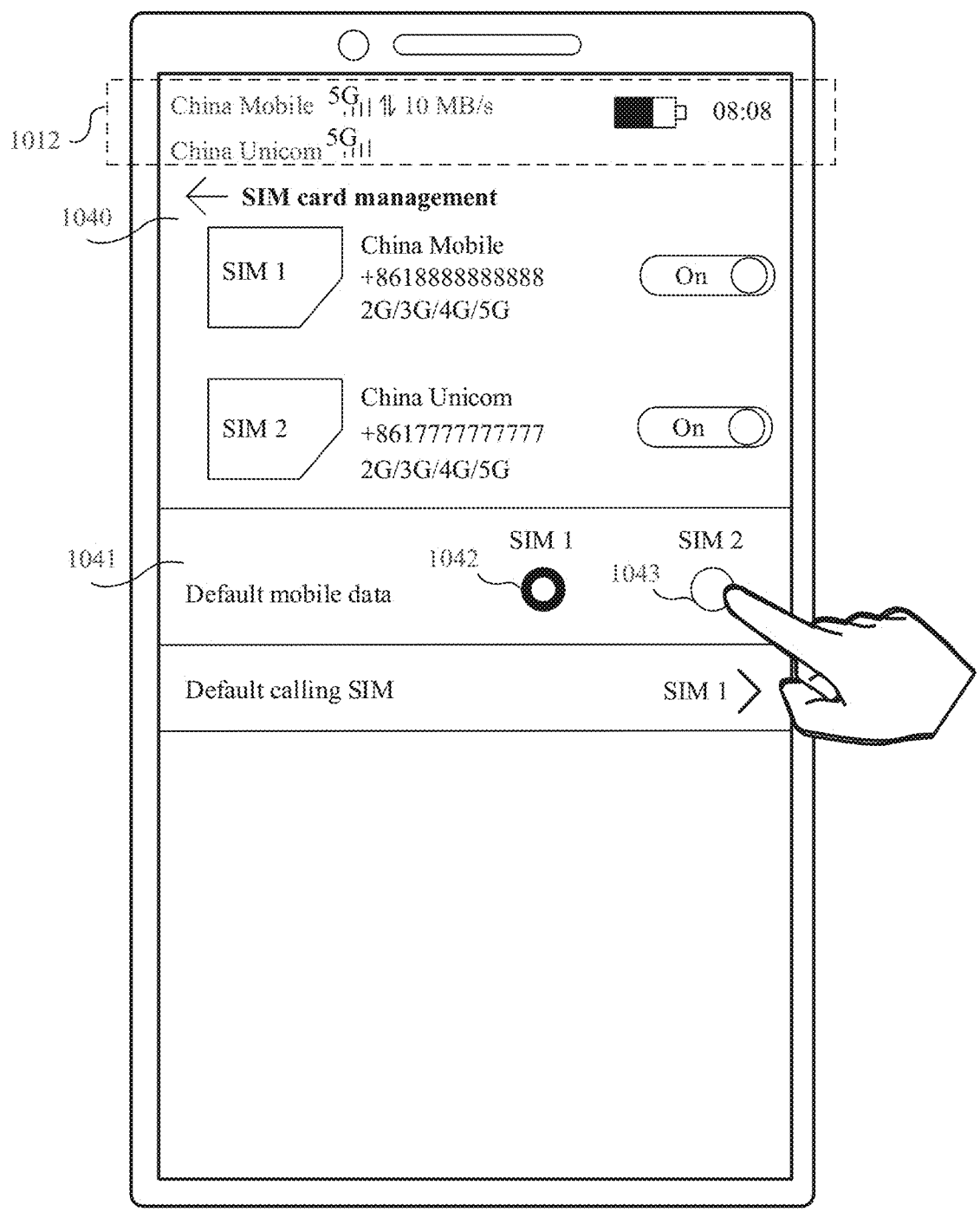

The terminal 100 may receive an operation (for example, click) on the SIM card management settings bar 1031, and in response to the operation, the terminal 100 may display a SIM card management interface 1040 shown in FIG. 10D.

As shown in FIG. 10D, the SIM card management interface 1040 includes a plurality of SIM card settings bars (for example, a SIM 1 settings bar and a SIM 2 settings bar), a data service settings bar 1041, and the like. Currently, by default, the data service of the terminal 100 is set on the SIM card 1. Therefore, in the data service settings bar 1041, a selection control 1042 corresponding to the SIM card 1 is in an enabled state, and a selection control 1043 corresponding to the SIM card 2 is in a disabled state. Currently, a data service download speed of the SIM card 1 displayed in the status bar 1012 is "10 MB/s", and the SIM card 2 does not support the data service and supports only the voice service.

The terminal 100 may receive an operation (for example, click) performed on a selection control 1042 in a data service settings bar 1041. In response to the operation, the terminal 100 may switch the data service from the SIM card 1 to the SIM card 2.

Figure 10E:
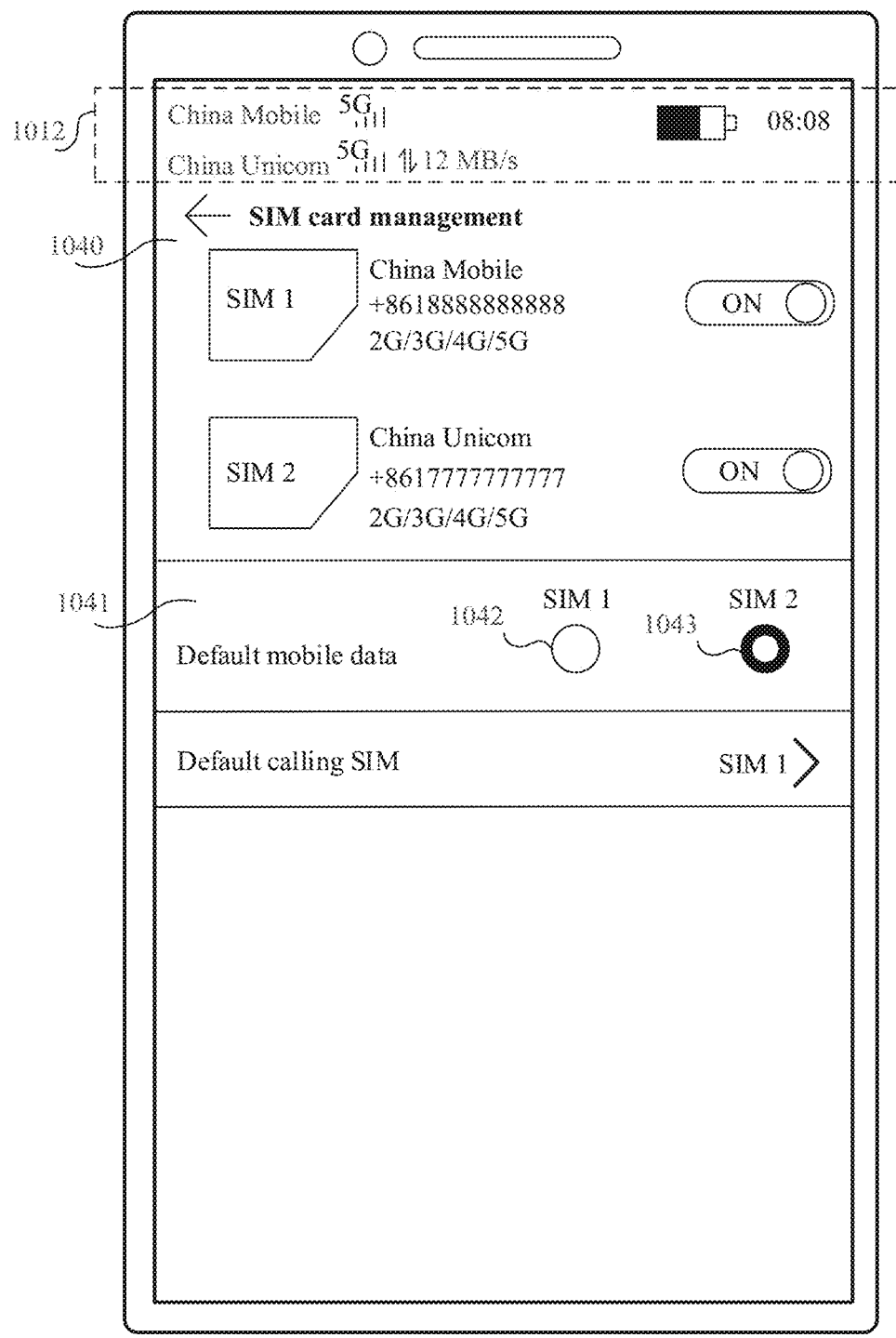

As shown in FIG. 10E, after the terminal 100 switches the data service from the SIM card 1 to the SIM card 2, the terminal 100 may switch the selection control 1042 corresponding to the SIM card 1 to the disabled state, and switch the selection control 1043 corresponding to the SIM card 2 to the enabled state. After the data service is switched to the SIM card 2, a data service download speed (for example, 10 MB/s) of the SIM card 2 may be displayed in the status bar 1012.

S903: In response to the service switching operation, the terminal 100 releases a radio frequency channel resource occupied by the secondary carrier of the first SIM card.

In a possible implementation, the terminal 100 may alternatively be triggered to switch the data service from the first SIM card to the second SIM card when detecting that a network state of the first SIM card meets a specific condition. After the data service is switched from the first SIM card to the second SIM card, the terminal 100 may access an internet by using the second SIM card. In other words, the terminal 100 sends a mobile network data packet to the network side or receives a mobile network data packet from the network side by using the second SIM card. The network state of the first SIM card includes one or more of a network signal strength, a network signal quality, a network standard, a data service transmission delay, or a data service transmission rate when the terminal 100 uses the first SIM card.

For example, the terminal 100 may switch the data service from the first SIM card to the second SIM card w % ben a signal strength of a primary cell on the first SIM card is equal to or less than a preset strength threshold, and/or a network signal quality of the first SIM card is equal to or less than a preset quality threshold, and/or a network standard of the first SIM card changes from a first-priority network standard (for example, 5G) to a second-priority network standard (for example, 4G), and/or a transmission delay of the data service on the first SIM card is greater than or equal to a preset delay threshold, and/or when the data transmission rate of the first SIM card is less than or equal to a preset speed threshold.

S904. The terminal 100 sends a measurement report 3 (which may be referred to as a third measurement report), where a signal quality of a secondary cell of the first SIM card is a preset value (for example, −141 dBm).

S905: After receiving the measurement report 3, the network device 210 releases the secondary carrier added for the first SIM card.

S906: The network device 220 sends RRC connection reconfiguration signaling 2 (which may be referred to as second RRC connection reconfiguration signaling) to the terminal 100, where the RRC connection reconfiguration signaling 2 includes a maximum quantity of MIMO layers of each secondary carrier on the second SIM card.

The network device 220 may periodically deliver the RRC connection reconfiguration signaling 2 to the terminal 100.

In a possible implementation, after releasing the radio frequency channel resource occupied by the secondary carrier of the first SIM card, the terminal 100 may actively send a secondary carrier adding request for the second SIM card to the network device 220. After receiving the secondary carrier adding request for the second SIM card, the network device 220 may send the RRC connection reconfiguration signaling 2 to the terminal 100.

S907: The terminal 100 determines, based on a maximum quantity of MIMO layers of each secondary carrier on the second SIM card, a radio frequency channel resource required by the second SIM card.

For example, the RRC connection reconfiguration signaling 2 includes a maximum quantity of MIMO layers of a secondary carrier of a band B1 and a maximum quantity of MIMO layers of a secondary carrier of a band B3 in the downlink of the first SIM card. In addition, the maximum quantity of the MIMO layers of the secondary carrier of the downlink band B1 is 2, and the maximum quantity of the MIMO layers of the secondary carrier of the downlink band B3 is 2. Therefore, the radio frequency channel resource required by the secondary carrier of the first SIM card is two receive radio frequency channels of the band B1 and two receive radio frequency channels of the band B3. The foregoing example is merely used to explain this application and shall not be construed as a limitation.

S908: The terminal 100 determines whether the radio frequency channel resource required by the secondary carrier is successfully allocated to the second SIM card.

If yes, step S909 is performed. S909: The terminal 100 may perform measurement and find that the signal strength of the secondary cell of the second SIM card is a second value.

For specific implementation of allocating, by the terminal 100, the radio frequency channel resource required by the secondary carrier to the second SIM card, refer to the embodiment shown in FIG. 7B. Details are not described herein again.

S910: The terminal 100 sends a measurement report 4 (which may be referred to as a fourth measurement report) to the network device 200, where a signal quality of the secondary cell in the measurement report 4 is the second value.

S911: After receiving the measurement report 4, the network device 220 adds the secondary carrier for the second SIM card of the terminal 100 if the second value is greater than a signal value threshold.

In a possible implementation, the terminal 100 may configure a reported secondary cell event based on measurement. The terminal 100 may measure a signal quality of the secondary cell on the second SIM card, and determine whether the signal quality of the secondary cell on the second SIM card is greater than a signal value threshold. If yes, the terminal 100 may report a specified event (for example, an "A2" event) to the network device 220 in the measurement report 4. After the network device 220 identifies the specified event (for example, the "A2" event) from the measurement report 1, the network device 220 may use RRC connection reconfiguration signaling carrying a specific field (for example, an sCellToAddMoList field) to add a secondary carrier for the second SIM card that is configured for the terminal 100.

A measurement parameter of the signal quality of the secondary cell on the second SIM card may include RSRP, and/or an SINR, and/or RSRQ of the secondary cell.

For a process in which the network device 220 adds the secondary carrier for the second SIM card of the terminal 100 after receiving the measurement report 4, refer to the embodiment shown in FIG. 7B. Details are not described herein again.

S912: When the terminal 100 determines that an idle radio frequency channel resource on the terminal 100 does not include the radio frequency channel resource required by the second SIM card, the terminal 100 sends a measurement report 5 (which may be referred to as a fifth measurement report) to the network device 220, where the signal strength of the secondary cell in the measurement report 5 is a preset value, and the preset value is less than the foregoing signal value threshold.

S913: After receiving the measurement report 5, the network device 220 releases the secondary carrier added for the second SIM card.

In a possible implementation, the terminal 100 may configure the reported secondary cell event based on measurement. When the terminal 100 determines that the idle radio frequency channel resource on the terminal 100 does not include the radio frequency channel resource required by the second SIM card, the terminal 100 may determine whether the preset value is greater than the signal value threshold. If no, the terminal 100 does not report the specified event (for example, the "A2" event) to the network device 200 in the measurement report 5. When the network device 220 does not identify the specified event from the measurement report 5, the network device 220 releases the secondary carrier added for the second SIM card of the terminal 100.

A measurement parameter of the signal quality of the secondary cell on the second SIM card may include RSRP, and/or an SINR, and/or RSRQ of the secondary cell.

For example, a preset value of the RSRP of the secondary cell on the first SIM card may be −156 dBm, a preset value of the RSRQ of the secondary cell may be −43, and a preset value of the SINR of the secondary cell may be −23.

An embodiment of this application provides a radio frequency channel sharing method. A terminal 100 may report a same radio frequency capability when a modem module corresponding to each SIM card registers with a network side and reports UE capability information, and the terminal 100 dynamically may allocate a radio frequency resource to each modem module. When the terminal 100 switches a data service from a first SIM card to a second SIM card, the terminal 100 may actively request, to a network side by using a modem module corresponding to the first SIM card, to release a secondary carrier on the first SIM card, and release a radio frequency channel resource occupied by the secondary carrier on the first SIM card. Then the terminal 100 adds a secondary carrier for the second SIM card, and configures a radio frequency channel resource required by the secondary carrier on the second SIM card. In this way, when the data service is switched between the different SIM cards, the terminal does not need to initiate a deregistration procedure and a registration procedure, thereby reducing a switching time.

In some embodiments, after receiving UE capability enquiry signaling that is sent by a network device 210 and that is for the first SIM card, the terminal 100 may send the first UE capability information to the network device 210, where the first SIM card supports a first radio frequency capability, and first UE capability information includes information about a first radio frequency capability. The terminal 100) sends second UE capability information to the network device 220 after receiving UE capability enquiry signaling sent by the network device 220 for the second SIM card, where the second SIM card supports a second radio frequency capability, the second UE capability information includes information about a first radio frequency capability, and the first radio frequency capability is stronger than the second radio frequency capability. When the terminal 100 meets a first condition, the terminal 100 may trigger the network device 220 to add the secondary carrier for the second SIM card. In this way, when the UE capability information is reported, the same maximum radio frequency capability of the two SIM cards is reported, which makes it possible to add a secondary carrier for the second SIM card.

When the terminal 100 meets the first condition, the terminal 100 may further determine whether the terminal 100 successfully allocates the radio frequency channel resource required by the secondary carrier to be added for the second SIM card. If yes, the terminal 100 may trigger the network device 220 to add the secondary carrier for the second SIM card. For a specific process in which the terminal 100 allocates the radio frequency channel resource required by the secondary carrier to be added for the second SIM card, refer to the embodiment shown in FIG. 7A. Details are not described herein again.

In a possible implementation, the terminal 100 may first configure the secondary carrier for the first SIM card. When the terminal 100 meets the first condition, if idle radio frequency channel resources on the terminal 100 are insufficient to be allocated to the secondary carrier of the second SIM card, the terminal 100 may further release the radio frequency channel resource occupied by the secondary carrier of the first SIM card.

In this embodiment of this application, the first condition may include one or more of the following: A signal strength of a primary cell on the first SIM card is equal to or less than a preset strength threshold, and/or a network signal quality of the first SIM card is equal to or less than a preset quality threshold, and/or a network standard of the first SIM card changes from a first-priority network standard (for example, 5G) to a second-priority network standard (for example, 4G), and/or a transmission delay of the data service on the first SIM card is greater than or equal to a preset delay threshold, and/or a data transmission rate on the first SIM card is equal to or less than a preset speed threshold.

In a possible implementation, the first SIM card may be a primary card and supports the data service and a voice communication service. The second SIM card may be a secondary SIM card and supports the voice communication service but does not support the data service. After the terminal 100 reports the first radio frequency capability of both the first SIM card and the second SIM card, because there are sufficient radio frequency channel resources, the terminal 100 may configure the radio frequency channel resource required by the secondary carrier for the first SIM card, so that the network device 210 may add the secondary carrier for the first SIM card. When the terminal 100 sets the first SIM card to the secondary SIM card and sets the second SIM card to the primary SIM card in response to a SIM card switching operation, the terminal 100 may release the radio frequency channel resource occupied by the secondary carrier of the first SIM card, and configure, for the second SIM card, the radio frequency channel resource required by the secondary carrier, so that the network device 220 configures the secondary carrier for the second SIM card. In this way, when the data service is switched between the different SIM cards, the terminal does not need to initiate a deregistration procedure and a registration procedure, thereby reducing a switching time.

For a signaling procedure of adding the secondary carrier, refer to the embodiment shown in FIG. 8A and FIG. 8B or FIG. 9A and FIG. 9B. Details are not described herein again.

The foregoing embodiments are merely intended to describe the technical solutions of this application, but are not to limit this application. Although this application is described in detail with reference to the foregoing embodiments, a person of ordinary skill in the art should understand that modifications may still be made to the technical solutions recorded in the foregoing embodiments or equivalent replacements may be made to some technical features thereof without departing from the scope of the technical solutions of embodiments of this application.

What is claimed is:

1. A method for radio frequency channel sharing, comprising:
   sending, by a terminal, first user equipment (UE) capability information to a network side device after receiving UE capability enquiry signaling that is sent by the network side device and that is for a first subscriber identity module (SIM) card;
   sending, by the terminal, second UE capability information to the network side device after receiving UE capability enquiry signaling that is sent by the network side device and that is for a second SIM card, wherein radio frequency capability information in the first UE capability information is the same as radio frequency capability information in the second UE capability information;
   receiving, by the terminal, first radio resource control (RRC) connection reconfiguration signaling that is sent by the network side device and that is for the first SIM card, wherein the first RRC connection reconfiguration signaling instructs adding a secondary carrier for the first SIM card;
   after adding the secondary carrier for the first SIM card in response to the first RRC connection reconfiguration signaling, receiving, by the terminal, a switching operation of switching a data service from the first SIM card to the second SIM card;
   releasing, by the terminal, a radio frequency channel occupied by the secondary carrier of the first SIM card in response to the switching operation;
   receiving, by the terminal, second RRC connection reconfiguration signaling that is sent by the network side device and that is for the second SIM card, wherein the second RRC connection reconfiguration signaling instructs adding a secondary carrier for the second SIM card; and in response to the second RRC connection reconfiguration signaling, configuring, by the terminal, a radio frequency channel for the secondary carrier of the second SIM card, and adding the secondary carrier of the second SIM card.

2. The method according to claim 1, wherein after the terminal receives the first RRC connection reconfiguration signaling, the method further comprises:
determining, by the terminal based on a band combination of the secondary carrier in the first RRC connection reconfiguration signaling and a quantity of multiple-input multiple-output (MIMO) layers of each band, a radio frequency channel required by the secondary carrier of the first SIM card; and
in response to determining that a radio frequency channel that is not configured on the terminal comprises the radio frequency channel required by the secondary carrier of the first SIM card, configuring, by the terminal, the required radio frequency channel for the first SIM card, and adding the secondary carrier for the first SIM card.

3. The method according to claim 2, wherein the adding, by the terminal, the secondary carrier for the first SIM card includes:
finding, by the terminal through measurement, that a signal strength of a secondary cell of the first SIM card is a first value; and
sending, by the terminal, a first measurement report to the network side device by using the first SIM card, wherein the signal strength of the secondary cell of the first SIM card in the first measurement report is the first value, and the first measurement report triggers the network side device to add the secondary carrier for the first SIM card.

4. The method according to claim 2, wherein the method further comprises:
in response to determining that the radio frequency channel that is not configured on the terminal does not comprise the radio frequency channel required by the secondary carrier of the first SIM card, finding, by the terminal through measurement, that a signal strength of a secondary cell of the first SIM card is a first value; and
sending, by the terminal, a second measurement report to the network side device by using the first SIM card, wherein the signal strength of the secondary cell of the first SIM card in the second measurement report is a preset value, the preset value is less than the first value, and the second measurement report triggers the network side device to release the secondary carrier of the first SIM card.

5. The method according to claim 1, wherein the method further comprises:
reporting, by the terminal, a third measurement report to the network side device in response to the switching operation, wherein a signal strength of a secondary cell of the first SIM card in the third measurement report is a preset value, and the third measurement report instructs the network side device to release the secondary carrier of the first SIM card.

6. The method according to claim 1, wherein after the terminal receives the second RRC connection reconfiguration signaling, the method further comprises:
determining, by the terminal based on a band combination of the secondary carrier in the second RRC connection reconfiguration signaling and a quantity of MIMO layers of each band, a radio frequency channel required by the secondary carrier of the second SIM card; and in response to determining that a radio frequency channel that is not configured on the terminal comprises the radio frequency channel required by the secondary carrier of the second SIM card, configuring, by the terminal, the required radio frequency channel for the second SIM card, and adding the secondary carrier for the second SIM card.

7. The method according to claim 6, wherein the method further comprises:
finding, by the terminal through measurement, that a signal strength of a secondary cell of the second SIM card is a second value; and
sending, by the terminal, a fourth measurement report to the network side device by using the second SIM card, wherein the signal strength of the secondary cell of the second SIM card in the fourth measurement report is the second value, and the fourth measurement report triggers the network side device to add the secondary carrier for the second SIM card.

8. The method according to claim 6, wherein the method further comprises:
in response to determining that the radio frequency channel that is not configured on the terminal does not comprise the radio frequency channel required by the secondary carrier of the second SIM card, finding, by the terminal through measurement, that a signal strength of a secondary cell of the second SIM card is a second value; and
sending, by the terminal, a fifth measurement report to the network side device by using the second SIM card, wherein the signal strength of the secondary cell of the second SIM card in the fifth measurement report is a preset value, the preset value is less than the second value, and the fifth measurement report triggers the network side device to release the secondary carrier of the second SIM card.

9. The method according to claim 1, wherein before the terminal receives the switching operation, the first SIM card supports a first radio frequency capability, the second SIM card supports a second radio frequency capability, the first radio frequency capability is stronger than the second radio frequency capability, the radio frequency capability information in the first UE capability information is the first radio frequency capability, the radio frequency capability information in the second UE capability information is the first radio frequency capability, the first radio frequency capability comprises a capability of enabling the network side device to add a secondary carrier for the terminal, and the second radio frequency capability does not comprise the capability of enabling the network side device to add the secondary carrier for the terminal.

10. The method according to claim 1, wherein the radio frequency capability information comprises a band combination supporting carrier aggregation (CA) and a quantity of MIMO layers of each band, and both the first UE capability information and the second UE capability information comprise one or more bandEUTRA information elements and a FeatureSet information element corresponding to each bandEUTRA information element, wherein the one or more bandEUTRA information elements indicate the band combination supporting CA, and the FeatureSet information element corresponding to each bandEUTRA information element indicates the quantity of the MIMO layers of each band.

11. A terminal, wherein at least a first subscriber identity module (SIM) card and a second SIM card are installed on the terminal, the terminal comprises one or more processors and one or more memories, the one or more memories are coupled to the one or more processors, and the one or more memories store programming instructions for execution by the one or more processors to cause the terminal to perform operations comprising;

sending first user equipment (UE) capability information to a network side device after receiving UE capability enquiry signaling that is sent by the network side device and that is for the first SIM card;

sending second UE capability information to the network side device after receiving UE capability enquiry signaling that is sent by the network side device and that is for the second SIM card, wherein radio frequency capability information in the first UE capability information is the same as radio frequency capability information in the second UE capability information;

receiving first radio resource control (RRC) connection reconfiguration signaling that is sent by the network side device and that is for the first SIM card, wherein the first RRC connection reconfiguration signaling instructs adding a secondary carrier for the first SIM card;

after adding the secondary carrier for the first SIM card in response to the first RRC connection reconfiguration signaling, receiving a switching operation of switching a data service from the first SIM card to the second SIM card;

releasing a radio frequency channel occupied by the secondary carrier of the first SIM card in response to the switching operation;

receiving second RRC connection reconfiguration signaling that is sent by the network side device and that is for the second SIM card, wherein the second RRC connection reconfiguration signaling instructs adding a secondary carrier for the second SIM card; and in response to the second RRC connection reconfiguration signaling, configuring a radio frequency channel for the secondary carrier of the second SIM card, and adding the secondary carrier of the second SIM card.

12. The terminal according to claim 11, wherein after the receiving the first RRC connection reconfiguration signaling, the operations further comprise:

determining based on a band combination of the secondary carrier in the first RRC connection reconfiguration signaling and a quantity of multiple-input multiple-output (MIMO) layers of each band, a radio frequency channel required by the secondary carrier of the first SIM card; and in response to determining that a radio frequency channel that is not configured on the terminal comprises the radio frequency channel required by the secondary carrier of the first SIM card, configuring the required radio frequency channel for the first SIM card, and adding the secondary carrier for the first SIM card.

13. The terminal according to claim 12, wherein the adding the secondary carrier for the first SIM card includes:

finding through measurement, that a signal strength of a secondary cell of the first SIM card is a first value; and sending a first measurement report to the network side device by using the first SIM card, wherein the signal strength of the secondary cell of the first SIM card in the first measurement report is the first value, and the first measurement report triggers the network side device to add the secondary carrier for the first SIM card.

14. The terminal according to claim 12, wherein the operations further comprise:

in response to determining that the radio frequency channel that is not configured on the terminal does not comprise the radio frequency channel required by the secondary carrier of the first SIM card, finding through measurement, that a signal strength of a secondary cell of the first SIM card is a first value; and sending a second measurement report to the network side device by using the first SIM card, wherein the signal strength of the secondary cell of the first SIM card in the second measurement report is a preset value, the preset value is less than the first value, and the second measurement report triggers the network side device to release the secondary carrier of the first SIM card.

15. The terminal according to claim 11, wherein the operations further comprise:

reporting a third measurement report to the network side device in response to the switching operation, wherein a signal strength of a secondary cell of the first SIM card in the third measurement report is a preset value, and the third measurement report instructs the network side device to release the secondary carrier of the first SIM card.

16. The terminal according to claim 11, wherein after receiving second RRC connection reconfiguration signaling, the operations further comprise:

determining based on a band combination of the secondary carrier in the second RRC connection reconfiguration signaling and a quantity of MIMO layers of each band, a radio frequency channel required by the secondary carrier of the second SIM card; and in response to determining that a radio frequency channel that is not configured on the terminal comprises the radio frequency channel required by the secondary carrier of the second SIM card, configuring the required radio frequency channel for the second SIM card, and adding the secondary carrier for the second SIM card.

17. The terminal according to claim 16, wherein the operations further comprise:

finding through measurement, that a signal strength of a secondary cell of the second SIM card is a second value; and sending a fourth measurement report to the network side device by using the second SIM card, wherein the signal strength of the secondary cell of the second SIM card in the fourth measurement report is the second value, and the fourth measurement report triggers the network side device to add the secondary carrier for the second SIM card.

18. The terminal according to claim 16, wherein the operations further comprise:

in response to determining that the radio frequency channel that is not configured on the terminal does not comprise the radio frequency channel required by the secondary carrier of the second SIM card, finding through measurement, that a signal strength of a secondary cell of the second SIM card is a second value; and sending a fifth measurement report to the network side device by using the second SIM card, wherein the signal strength of the secondary cell of the second SIM card in the fifth measurement report is a preset value, the preset value is less than the second value, and the fifth measurement report triggers the network side device to release the secondary carrier of the second SIM card.

19. The terminal according to claim 11, wherein before receiving the switching operation, the first SIM card supports a first radio frequency capability, the second SIM card supports a second radio frequency capability, the first radio frequency capability is stronger than the second radio frequency capability, the radio frequency capability information in the first UE capability information is the first radio frequency capability, the radio frequency capability information in the second UE capability information is the first radio frequency capability, the first radio frequency capability comprises a capability of enabling the network side device to add a secondary carrier for the terminal, and the second radio frequency capability does not comprise the capability of enabling the network side device to add the secondary carrier for the terminal.

20. A non-transitory computer storage medium of and storing programming instructions for execution by one or more processors to cause a terminal device to perform operations comprising:
  sending first user equipment (UE) capability information to a network side device after receiving UE capability enquiry signaling that is sent by the network side device and that is for a first subscriber identity module (SIM) card;
  sending second UE capability information to the network side device after receiving UE capability enquiry signaling that is sent by the network side device and that is for a second SIM card, wherein radio frequency capability information in the first UE capability information is the same as radio frequency capability information in the second UE capability information;
  receiving first radio resource control (RRC) connection reconfiguration signaling that is sent by the network side device and that is for the first SIM card, wherein the first RRC connection reconfiguration signaling instructs adding a secondary carrier for the first SIM card;
  after adding the secondary carrier for the first SIM card in response to the first RRC connection reconfiguration signaling, receiving a switching operation of switching a data service from the first SIM card to the second SIM card;
  releasing a radio frequency channel occupied by the secondary carrier of the first SIM card in response to the switching operation;
  receiving second RRC connection reconfiguration signaling that is sent by the network side device and that is for the second SIM card, wherein the second RRC connection reconfiguration signaling instructs adding a secondary carrier for the second SIM card; and
  in response to the second RRC connection reconfiguration signaling, configuring a radio frequency channel for the secondary carrier of the second SIM card, and adding the secondary carrier of the second SIM card.

* * * * *